US012567129B2

(12) United States Patent
Chen et al.

(10) Patent No.: US 12,567,129 B2
(45) Date of Patent: Mar. 3, 2026

(54) IMAGE PROCESSING METHOD AND ELECTRONIC DEVICE

(71) Applicant: Huawei Technologies Co., Ltd., Shenzhen (CN)

(72) Inventors: Wendong Chen, Shenzhen (CN); Shuai Chen, Shenzhen (CN); Meng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 259 days.

(21) Appl. No.: 18/256,158

(22) PCT Filed: Dec. 3, 2021

(86) PCT No.: PCT/CN2021/135353
§ 371 (c)(1),
(2) Date: Jun. 6, 2023

(87) PCT Pub. No.: WO2022/121796
PCT Pub. Date: Jun. 16, 2022

(65) Prior Publication Data
US 2024/0037708 A1 Feb. 1, 2024

(30) Foreign Application Priority Data
Dec. 7, 2020 (CN) .......................... 202011420630.6

(51) Int. Cl.
*G06T 5/50* (2006.01)
*G06T 7/10* (2017.01)
*H04N 23/68* (2023.01)

(52) U.S. Cl.
CPC .................. *G06T 5/50* (2013.01); *G06T 7/10* (2017.01); *H04N 23/683* (2023.01); *G06T 2207/20081* (2013.01); *G06T 2207/20221* (2013.01)

(58) Field of Classification Search
CPC .................................... G06T 5/50; G06T 7/10
See application file for complete search history.

(56) References Cited

U.S. PATENT DOCUMENTS

2015/0254882 A1* 9/2015 Englert ................ G02B 27/017
345/633
2016/0330399 A1 11/2016 Joshi et al.
(Continued)

FOREIGN PATENT DOCUMENTS

CN 109360261 A 2/2019
CN 110175951 A 8/2019
(Continued)

OTHER PUBLICATIONS

Chan, Everybody Dance Now, 2019 (Year: 2019).*
Manuel Ruder et al, "Artistic style transfer for videos," arXiv:1604. 08610v2, Oct. 19, 2016, total 14 pages.

*Primary Examiner* — Yi Yang
(74) *Attorney, Agent, or Firm* — Conley Rose, P.C.

(57) ABSTRACT

An image processing method includes an electronic device configured to perform style migration processing on a first image sequence based on a target migration style by using a fused style migration model into which a plurality of single-style migration models is fused in order to obtain a second image sequence. A style of a $1^{st}$ frame of image to a style of a last frame of image in the second image sequence change in a first style order in styles of output images of the plurality of single-style migration models. The first image sequence may be from a video shot by using the electronic device. The electronic device may save a plurality of frames of images in the second image sequence as a video. The video may present an effect of rapid time lapse during play.

20 Claims, 28 Drawing Sheets

(56) References Cited

U.S. PATENT DOCUMENTS

| | | | | |
|---|---|---|---|---|
| 2017/0344884 A1* | 11/2017 | Lin | ......................... | G06N 3/048 |
| 2018/0082715 A1* | 3/2018 | Rymkowski | ........... | G06V 20/10 |
| 2018/0357800 A1* | 12/2018 | Oxholm | ............... | G06T 11/001 |
| 2019/0289203 A1* | 9/2019 | Suitoh | ..................... | G06T 15/20 |
| 2019/0306417 A1* | 10/2019 | Yaguchi | ................ | G01S 3/7865 |

FOREIGN PATENT DOCUMENTS

| | | | |
|---|---|---|---|
| CN | 110363293 A | 10/2019 |
| CN | 110909790 A | 3/2020 |
| CN | 111556244 A | 8/2020 |
| CN | 111667399 A | 9/2020 |

* cited by examiner

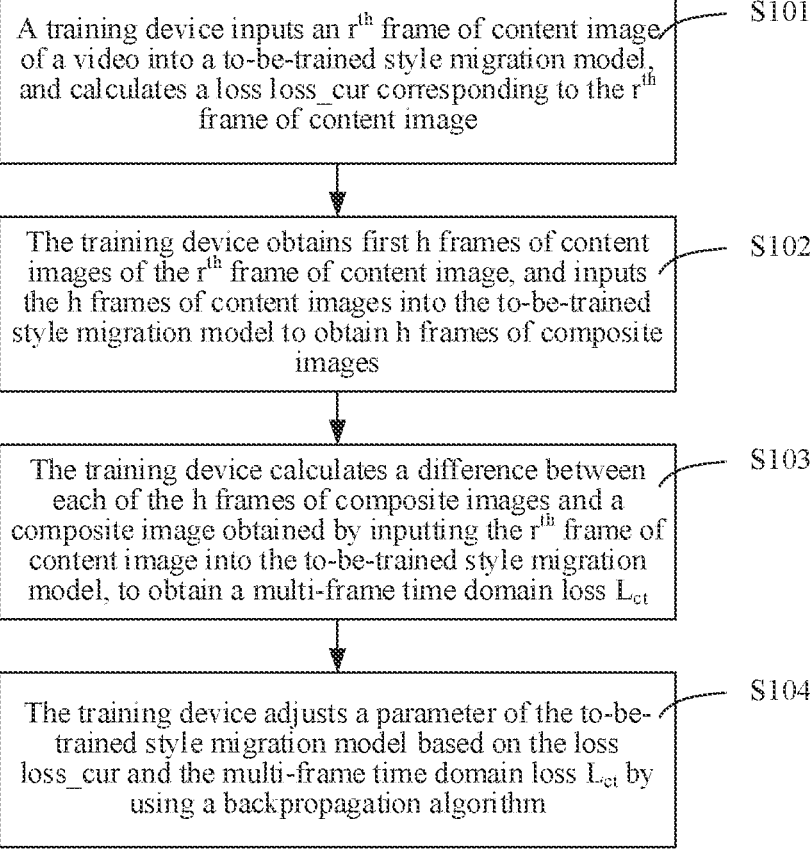

A training device inputs an $r^{th}$ frame of content image of a video into a to-be-trained style migration model, and calculates a loss loss_cur corresponding to the $r^{th}$ frame of content image ~ S101

The training device obtains first h frames of content images of the $r^{th}$ frame of content image, and inputs the h frames of content images into the to-be-trained style migration model to obtain h frames of composite images ~ S102

The training device calculates a difference between each of the h frames of composite images and a composite image obtained by inputting the $r^{th}$ frame of content image into the to-be-trained style migration model, to obtain a multi-frame time domain loss $L_{ct}$ ~ S103

The training device adjusts a parameter of the to-be-trained style migration model based on the loss loss_cur and the multi-frame time domain loss $L_{ct}$ by using a backpropagation algorithm ~ S104

FIG. 5

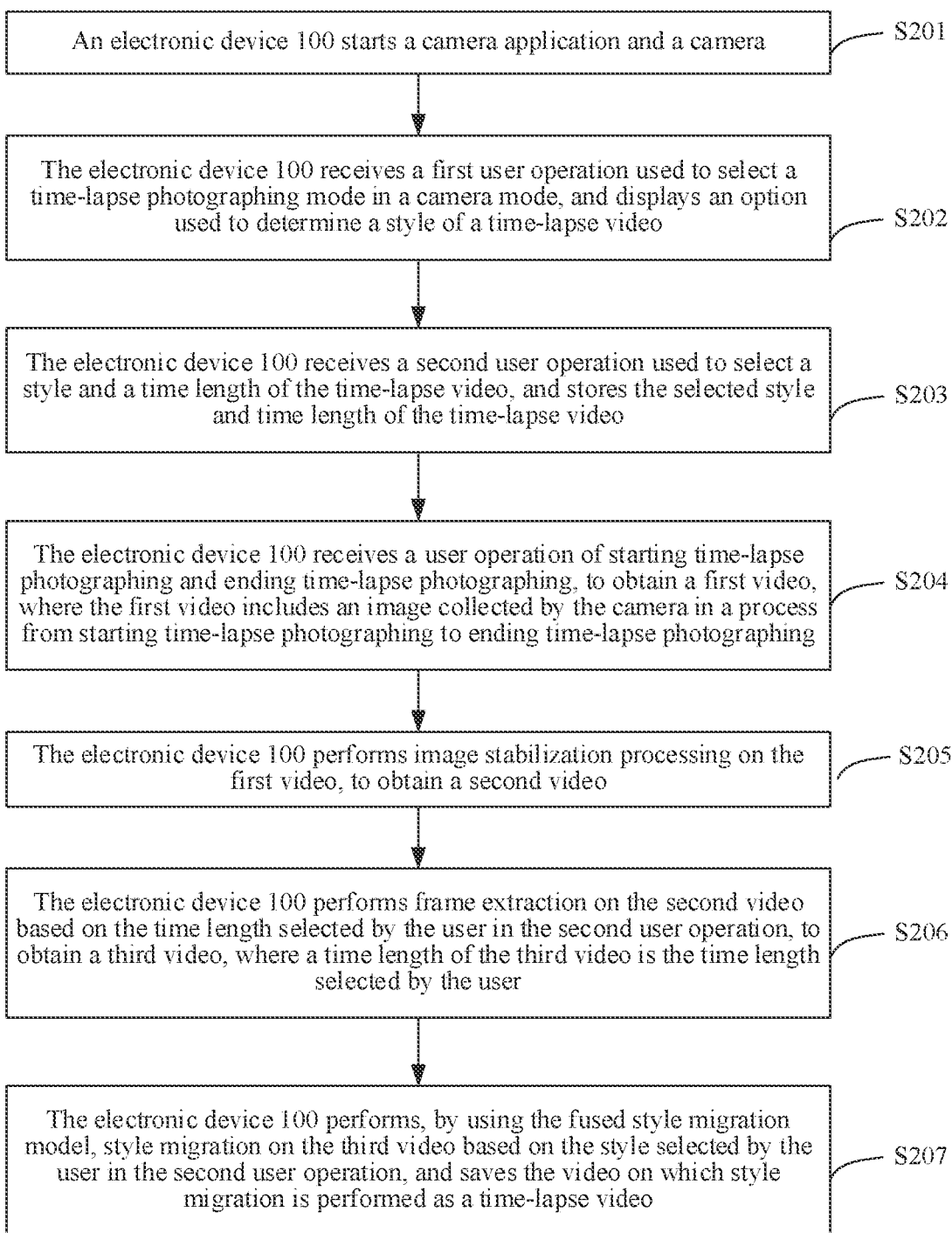

An electronic device 100 starts a camera application and a camera — S201

The electronic device 100 receives a first user operation used to select a time-lapse photographing mode in a camera mode, and displays an option used to determine a style of a time-lapse video — S202

The electronic device 100 receives a second user operation used to select a style and a time length of the time-lapse video, and stores the selected style and time length of the time-lapse video — S203

The electronic device 100 receives a user operation of starting time-lapse photographing and ending time-lapse photographing, to obtain a first video, where the first video includes an image collected by the camera in a process from starting time-lapse photographing to ending time-lapse photographing — S204

The electronic device 100 performs image stabilization processing on the first video, to obtain a second video — S205

The electronic device 100 performs frame extraction on the second video based on the time length selected by the user in the second user operation, to obtain a third video, where a time length of the third video is the time length selected by the user — S206

The electronic device 100 performs, by using the fused style migration model, style migration on the third video based on the style selected by the user in the second user operation, and saves the video on which style migration is performed as a time-lapse video — S207

FIG. 6

Segment a panorama

1ˢᵗ area          2ⁿᵈ area          3ʳᵈ area          (m–1)ᵗʰ area          mᵗʰ area Fused style       Fused style       Fused style       Fused style          Fused style
migration         migration         migration         migration            migration
model a1          model a2          model a3          model a(m–1)         model am

TO FIG. 9B

CONT.FROM FIG. 9A

IMAGE PROCESSING METHOD AND ELECTRONIC DEVICE

CROSS-REFERENCE TO RELATED APPLICATIONS

This is a National Stage of International Patent Application No. PCT/CN2021/135353 filed on Dec. 3, 2021, which claims priority to Chinese Patent Application No. 202011420630.6 filed on Dec. 7, 2020. Both of the aforementioned applications are hereby incorporated by reference in their entireties.

TECHNICAL FIELD

This application relates to the field of terminal technologies, and in particular, to an image processing method and an electronic device.

BACKGROUND

With development of electronic technologies, a user may perform time-lapse photographing by using an electronic device, such as a mobile phone or a tablet computer, that includes a camera, and compress a video shot in a relatively long time, for example, several hours, several days, or even several years, into a short-time video for play, to present a wonderful scene that usually cannot be perceived by naked eyes.

In the foregoing time-lapse photographing process, the electronic device may perform frame extraction processing on a video to achieve the foregoing time-lapse photographing effect. However, when shooting a time-lapse video, the user usually needs to fix the electronic device in a place for a long time. This imposes a relatively high limitation on a scene, a device, and duration of time-lapse photographing.

SUMMARY

This application provides an image processing method and an electronic device, so that style migration can be performed on a video shot by a user, so that the video shot by the user in a short time has a time-lapse effect of shooting a video for a long time, thereby improving convenience and interest of performing time-lapse photographing by the user.

According to a first aspect, this application provides an image processing method. The method includes: An electronic device obtains a first image sequence. The electronic device processes the first image sequence based on a target migration style, to obtain a second image sequence. Both the first image sequence and the second image sequence include n frames of images. Higher-layer semantic information of an $i^{th}$ frame of image in the first image sequence is the same as that of an $i^{th}$ frame of image in the second image sequence. The $i^{th}$ frame of image in the first image sequence and the $i^{th}$ frame of image in the second image sequence have different styles. The target migration style indicates that a style of a $1^{st}$ frame of image to a style of an $n^{th}$ frame of image in the second image sequence change in M styles in a first style order, n and M are integers greater than 1, and i is a positive integer less than or equal to n. The electronic device may save the second image sequence.

The first image sequence may be a video or a plurality of frames of images obtained by segmenting a panorama.

An image style may include an image texture feature and an image artistic representation form. Content of the image may include low-layer semantic information and high-layer semantic information of the image. The low-layer semantic information of the image is the style of the image. The high-level semantic information of the image refers to an object that is expressed by the image and that is closest to human understanding. That the electronic device processes the first image sequence based on the target migration style may be specifically performing style migration processing. The style migration processing may be changing the style of the image. That is, the style of the image on which style migration processing is performed changes, but the high-layer semantic information of the original image remains unchanged.

For example, the foregoing target migration style may be a style such as a day and night conversion style, a four-season change style, or a sunny and rainy weathers alternating style. The target migration style may be determined by the electronic device based on a style option selected by the user.

The target migration style may be used to determine a size of M, namely, a quantity of style migration models used for fusion. In some embodiments, the higher-layer semantic information of the image in the second image sequence obtained in the foregoing first style order may present a change in natural time order. For example, the target migration style is a day and night conversion style. In this case, the M styles may be a daytime style and a night style. The first style order may be an order of changing from the daytime style to the night style. The target migration style is the four-season change style. In this case, the M styles may be a spring style, a summer style, an autumn style, and a winter style. The foregoing first style order may be changing from the spring style to the summer style, then from the summer style to the autumn style, and then from the autumn style to the night style. An arrangement order of the M styles in the first style order is not limited in this embodiment of this application.

In some embodiments, the electronic device may process the first image sequence based on the target migration style by using k fused style migration models, where k is less than or equal to n. Output images of the k fused style migration models are the second image sequence. An output image of one fused style migration model is one frame of image or a plurality of consecutive frames of images in the second image sequence.

One of the k fused style migration models is generated by weighting M single-style migration models. If a style of an output image of the one fused style migration model is closer to a style of an output image of a $j^{th}$ single-style migration model, a weight of the $j^{th}$ single-style migration model is larger when the one fused style migration model is generated. Styles of respective output images of the M single-style migration models form the M styles, and j is a positive integer less than or equal to M.

For example, the target migration style is a day and night conversion style. The single-style migration model used by the electronic device to generate the fusion model may be a daytime style migration model and a night style migration model. In the fused style migration model used to perform style migration processing on the first image sequence, weights of the daytime style migration model and the night style migration model are different. Specifically, from a first fused style migration model to a $k^{th}$ fused style migration model, a weight of the daytime style migration model may gradually decrease, and a weight of the night style migration model may gradually increase. The electronic device may perform style migration processing on the first image sequence by using the k fused style migration models, to obtain the second image sequence. Styles of a $1^{st}$ frame of image to an $n^{th}$ frame of image in the second image sequence may gradually change from a daytime style to a night style.

In some embodiments, both the k fused style migration models and the M single-style migration models are neural network models, and have a same neural network structure.

The single-style migration model used to generate the fused style migration model is obtained through training.

In some embodiments, the electronic device may obtain a training dataset. The training dataset includes one or more frames of style images and a plurality of frames of content images in a first video. A style of the one or more frames of style images is a style of an output image of the trained single-style migration model. The content image may be an image of which a style needs to be migrated. The electronic device may process a plurality of frames of content images in the first video by using a to-be-trained single-style migration model, to obtain a plurality of frames of composite images.

The electronic device may train the to-be-trained single-style migration model by using a loss function, to obtain the trained single-style migration model. The loss function may include a high-layer semantic information loss function, a style loss function, and a time-domain constraint loss function. The high-layer semantic information loss function is determined based on high-layer semantic information of the plurality of frames of content images and high-layer semantic information of the plurality of frames of composite images. The style loss function is determined based on styles of the plurality of frames of content images and styles of the plurality of frames of composite images. The time-domain constraint loss function is determined based on a style of one frame of composite image in the plurality of frames of composite images and styles of a plurality of frames of composite images adjacent to the one frame of composite image.

In the foregoing embodiment, the electronic device introduces the foregoing time-domain constraint loss function into the loss function used for training the single-style migration model, so that a relationship between a plurality of consecutive frames of content images can be considered, and a probability of styles of adjacent frames of images hop when the single-style migration model performs style migration processing on a plurality of frames of images in a video is reduced. In this way, when the trained style migration model is used to perform style migration on the plurality of frames of images in a video, consistency of style effects of the plurality of consecutive frames of content images in the video can be improved, and a flickering phenomenon in a video playback process can be eliminated.

In some embodiments, the trained single-style migration model may be stored in the electronic device. When style migration needs to be performed on a video by using the fused style migration model, the electronic device may locally obtain the single-style migration model for fusion.

Optionally, the trained single-style migration model may be stored on a cloud. The electronic device may upload, to the cloud, a video of which a style needs to be migrated and the target migration style. The cloud may perform style migration on the video by using the fused style migration model, and send, to the electronic device, an obtained video on which the style migration is performed. Alternatively, the electronic device 100 may send only the target migration style to the cloud. The cloud may send, based on the target migration style, the single-style migration model that needs to be fused to the electronic device.

In some embodiments, the electronic device may enable a camera to collect the first video, and obtaining the n frames of images in the first image sequence based on the first video. The first video includes z frames of images. The n frames of images are extracted from the z frames of images.

In some embodiments, when obtaining the first video through collection, the electronic device may further perform image stabilization processing on the first video. The foregoing image stabilization processing may be, for example, image stabilization processing in methods such as electronic image stabilization and/or optical image stabilization.

It can be learned from the foregoing embodiment that, the electronic device may perform frame extraction and style migration processing on a video that is obtained by instant shooting by a user. In this way, a video shot by a user in a short time can have a time-lapse effect of long-time video shooting. For example, the time-lapse video shot by the user within one minute may have a time-lapse effect of changing gradually quickly from daytime to night that originally needs to be shot for 12 hours or even longer. In addition, the electronic device performs image stabilization processing on the shot video. In this way, when shooting a time-lapse video, the user may hold the electronic device to perform shooting, and no fixing device is required to fix the electronic device used for shooting in one place. In the foregoing method, time-lapse photographing breaks through limitations on a shooting scene, a device, and a time, and convenience and interest of performing time-lapse photographing by a user are improved.

In some embodiments, the electronic device may obtain, based on a first video selected by a user, the first video from a locally stored video, and obtain the n frames of images in the first image sequence based on the first video. The first video includes z frames of images, and the n frames of images are extracted from the z frames of images.

In other words, the user may select a corresponding video from locally stored videos in a gallery application, and the like. The electronic device may perform the foregoing frame extraction and style migration processing on the video selected by the user, so that the video obtained through processing may have a time-lapse effect of long-time video shooting. In addition to the locally stored video, the electronic device may further obtain the video from the cloud to perform the foregoing frame extraction and style migration processing.

In some embodiments, a frame extraction ratio of extraction is determined based on playback duration of the first image sequence selected by the user, and the frame extraction ratio is a ratio of the playback duration of the first image sequence to collection duration of the first video. For example, the collection duration of the first video is one minute. The playback duration of the first image selected by the user is 10 seconds. In this case, the electronic device may extract the first image sequence from a plurality of frames of images of the first video at a ratio of 1:6.

In the foregoing frame extraction method, a frame extraction ratio of the first video may be customized based on the playback duration of the first image sequence that the user selects to generate. In this way, the electronic device can provide a maximum frame extraction ratio that is not limited by the collection duration of the first video.

In some embodiments, the electronic device may sequentially save the n frames of images in the second image sequence in series as a video. In a process of playing the video, an effect that the M styles change according to the first style order may be presented.

In some embodiments, the electronic device may obtain a first image, and segment the first image, to obtain the n frames of images in the first image sequence.

The electronic device segments the first image in a manner of capturing an image by using a sliding window. A length of the sliding window may be a first length. A distance of each sliding of the sliding window may be a first sliding distance. The electronic device may slide the sliding window from one side of the first image to the other side for n−1 times, to obtain the n frames of images whose lengths are all the first length. The first length may be less than the first sliding distance. That is, adjacent images in the n frames of images have an overlapping part.

In some embodiments, the electronic device may capture one splicing area from each frame of image in the second image sequence, to obtain n splicing areas. The n splicing areas have no overlapping part. The electronic device may splice the n splicing areas to obtain a second image, and store the second image. Resolution of the second image is the same as resolution of the first image. The high-layer semantic information of the second image is the same as the high-layer semantic information of the first image.

Resolutions of the n splicing areas may be the same or different.

The first image may be obtained by the user by enabling a camera of the electronic device to take a photo immediately, or may be selected by the user from a gallery application of the electronic device.

For example, the target migration style is a day and night conversion style. The electronic device may perform style migration processing on the first image sequence by using the fused style migration model. The second image obtained by the electronic device by splicing the splicing areas in the second image sequence may present a process of gradually changing from a daytime style to a night style from one side to the other side.

In the foregoing method, adjacent images in the first image sequence have an overlapping part. After the electronic device separately performs style migration on the first image sequence by using the fused style migration model, a style of a splicing area captured from adjacent images may be more smoothly migrated. That is, the foregoing method for segmenting the first image and capturing a splicing area from each image obtained through style migration can improve smoothness of a style effect of the first image. A style of the second image obtained by splicing by the electronic device from one side to the other side may change more smoothly in the M styles in the first style order.

In the foregoing embodiment, by segmenting the first image to obtain the first image sequence, capturing the splicing areas from the second image sequence, and splicing the splicing areas to obtain the second image, the second image with a style migration effect may be obtained. This can improve interest of the user in taking an image, especially in taking a panorama.

According to a second aspect, this application provides an electronic device, and the electronic device may include a display, a memory, and one or more processors. The memory may be configured to store a plurality of single-style migration models. The memory may be further configured to store a computer program. The processor may be configured to invoke the computer program in the memory, so that the electronic device performs any possible implementation of the first aspect.

According to a third aspect, this application provides a computer storage medium, including instructions. When the instructions are run on an electronic device, the electronic device performs any possible implementation of the first aspect.

According to a fourth aspect, an embodiment of this application provides a chip. The chip is applied to an electronic device, the chip includes one or more processors, and the processor is configured to invoke computer instructions, so that the electronic device performs any possible implementation of the first aspect.

According to a fifth aspect, an embodiment of this application provides a computer program product including instructions. When the computer program product runs on a device, the electronic device performs any possible implementation of the first aspect.

It may be understood that the electronic device provided in the second aspect, the computer storage medium provided in the third aspect, the chip provided in the fourth aspect, and the computer program product provided in the fifth aspect are all configured to perform the method provided in embodiments of this application. Therefore, for beneficial effects that can be achieved, refer to beneficial effects in a corresponding method. Details are not described herein again.

BRIEF DESCRIPTION OF DRAWINGS

FIG. 5 is a flowchart of a style migration model training method according to an embodiment of this application:

FIG. 6 is a flowchart of a photographing method according to an embodiment of this application;

DESCRIPTION OF EMBODIMENTS

Figure 1A:
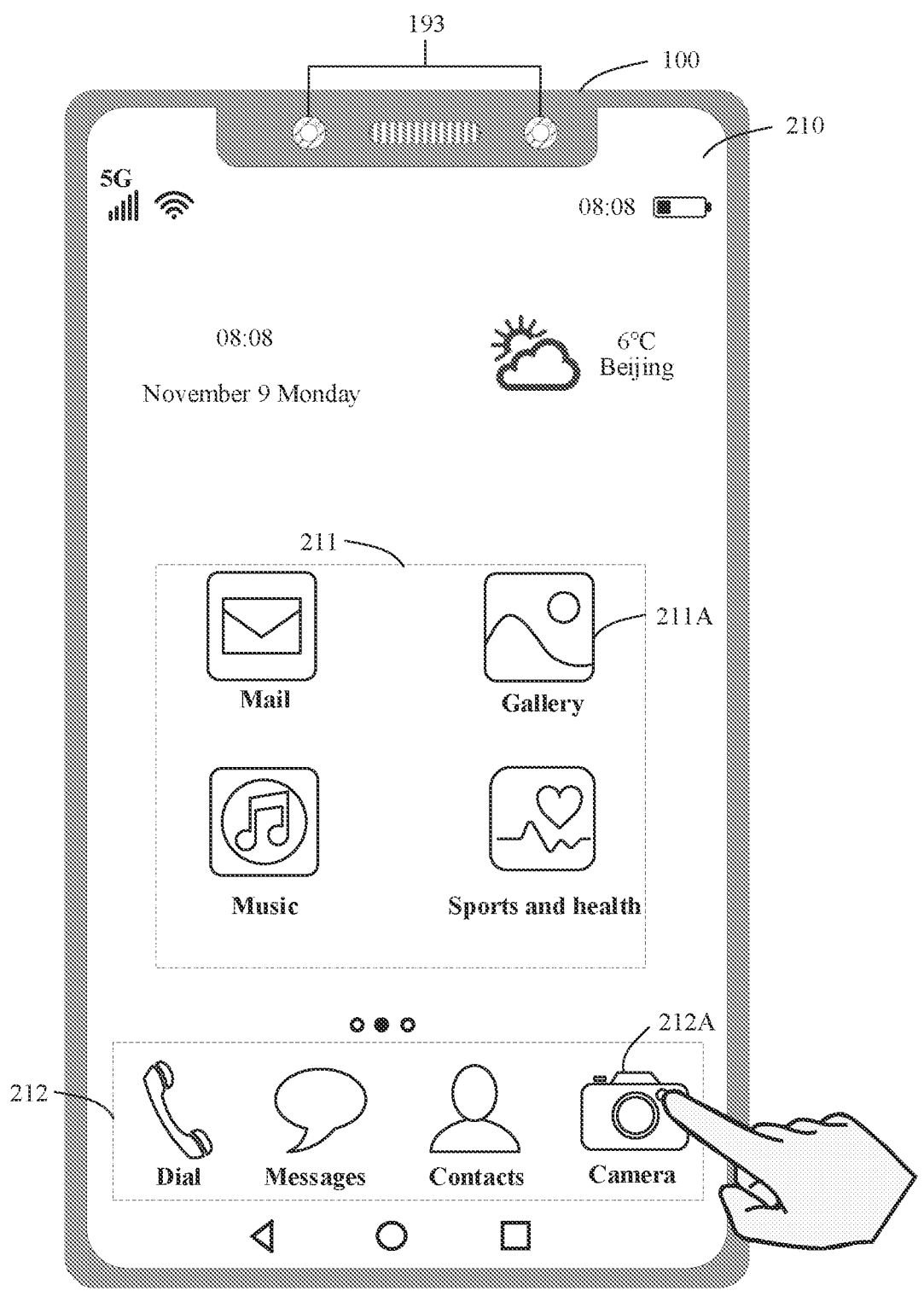
FIG. 1A to FIG. 1F are schematic diagrams of some user interfaces for shooting a time-lapse video according to an embodiment of this application.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

Time-lapse photography is a kind of photography technology that compresses time.

In a possible implementation, an electronic device may collect, at a rate of collecting an image during normal photographing (for example, collecting 30 frames of images per second), an image of a scene from the morning (for example, 7:00) to the night (for example, 22:00), to obtain an original video. Then, the electronic device may perform frame extraction on the original video. For example, the electronic device may extract one frame of image every 1800 frames of images. The electronic device may connect, in series in an order of collection time, a plurality of frames of images obtained after frame extraction processing, to obtain a time-lapse video. If a video play rate is playing 30 frames of images per second, the electronic device may compress a video of which a play time is 15 hours into a video of which play time is 30 seconds. To be specific, the electronic device may present a change of a scenic spot from 7:00 a.m. to 22:00 p.m. in a 30-second time-lapse video.

In another possible implementation, the electronic device may adjust an image collection rate to obtain a plurality of frames of images included in the time-lapse video. Specifically, the electronic device may collect an image based on a time-lapse rate entered by the user or a preset time-lapse rate. For example, the time-lapse rate is to collect two frames of images per second. Then, the electronic device may connect a plurality of frames of images collected at the foregoing time-lapse rate in series, and play the images in a video form.

It can be seen that time-lapse photographing generally takes a relatively long time for photographing. In addition, to avoid shaking during video shooting, when performing time-lapse photographing, the user usually needs to fix, by using a fixing device such as a tripod, an electronic device used for shooting in one place. This imposes great limitations on a shooting scene, device, and time of time-lapse photographing. It is difficult for a user to shoot a video with a time-lapse effect (for example, a fast change from day to night) in a short time by holding an electronic device (for example, a mobile phone). The foregoing time-lapse effect may be a process of compressing a process in which an object or a scene changes slowly in a relatively short time, and presenting a rapid change of an object or a scene.

An embodiment of this application provides an image processing method. In the method, the electronic device may perform image stabilization processing a first video obtained by photographing a first scenery in a first time period, to obtain a second video. Then, the electronic device may perform frame extraction processing on the second video, to obtain a third video. The electronic device may perform style migration on a plurality of frames of images in the third video by using a fused style migration model, to obtain a fourth video. The foregoing fused style migration model is obtained by the electronic device by fusing at least two style migration models. For example, the electronic device may perform style migration on the plurality of frames of images in the third video by using a model obtained by fusing a daytime style migration model and a night style migration model. Therefore, the fourth video may present an effect that the first scenery rapidly changes in time in an order from daytime to night. A length of the first time period is not limited in this embodiment of this application. The first time period may be a short time period, for example, 30 seconds or one minute.

It can be learned that, the electronic device may perform processing in the foregoing image processing method on a video shot in a short time, so that the video shot in the short time may have a time-lapse effect of long-time video shooting. In the foregoing image processing method, time-lapse photographing breaks through limitations on a shooting scene, a device, and a time, and convenience and interest of performing time-lapse photographing by a user are improved.

For ease of understanding the image processing method in this application, concepts of an image style, style migration, a style migration model, and a fused style migration model are described herein.

1. Image Style

The image style may include an image texture feature and an image artistic representation form. For example, the image style may be a cartoon style, a comic style, an oil painting style, a realistic style, a Ukiyoe style, a daytime style, a night style, a spring style, a summer style, an autumn style, a winter style, a sunny day style, a rainy day style, or the like. The image style is not limited in this embodiment of this application.

2. Style Migration

Performing style migration on an image may be performing fusion on a first image that has a style migration requirement and a second image that has a target style, to generate a third image. The foregoing fusion process may be a process of processing the first image by using a style migration model. The style migration model may be used to output an image having the target style. For description of the foregoing style migration model, refer to the following description of a third point.

The third image has high-layer semantic information in content of the first image and the style of the second image. Content of an image may include low-layer semantic information and high-layer semantic information of the image. The low-layer semantic information may be a color, a texture, and the like of the image. The low-layer semantic information of the image is also a style of the image. The high-level semantic information may refer to an object that is expressed by the image and that is closest to human understanding. For example, an image of sand, blue sky, and seawater. The low-layer semantic information of the image may include a color and texture of sand, blue sky, and seawater. The high-layer semantic information of the image may be that the image includes sand, blue sky, and seawater, and that the image is a beach image.

The first image that has the style migration requirement may be a content image. The second image that has the target style may be a style image. An image obtained by performing style migration on the content image may be a composite image. That the electronic device performs style migration on the content image is saving high-layer semantic information of the content image, and replacing a style of the content image with the style of the style image. For example, the content image is the beach image. A current style of the content image is a realistic style. The style of the style image is a cartoon style. The electronic device performs style migration on the beach image, and may convert the beach image of the realistic style into a cartoon-style beach image. The cartoon-style beach image obtained after the style migration can still present sand, blue sky, and seawater. However, compared with the low-layer semantic information of the beach image in the realistic style, the low-layer semantic information such as a color and a texture of the beach image in the cartoon style changes.

3. Style Migration Model

The style migration model may be used to receive a content image and generate a composite image. The composite image may have high-layer semantic information of the content image and a style corresponding to the style migration model. One style migration model may correspond to one style. For example, a cartoon style migration model may correspond to a cartoon style. The cartoon style migration model may replace a style of the received content image with the cartoon style. The style migration model may be specifically a neural network model. The style migration model may be obtained by using a large amount of training data. One piece of training data may include a training sample and a training result corresponding to the training sample. The training sample may include a content image (the foregoing first image) and a style image (the foregoing second image). The training result corresponding to the training sample may be a composite image (the third image).

A specific method for training the style migration model is described in a subsequent embodiment, and details are not described herein.

4. Fused Style Migration Model

The fused style migration model is a style migration model obtained by combining two or more style migration models. Weights of parameters in a plurality of style migration models that are fused may be different. The electronic device may change, by changing the weights of the parameters in the plurality of style migration models that are fused, a style corresponding to the obtained fused style migration model. For example, the electronic device may fuse a daytime style migration model and a night style migration model. The electronic device changes a weight of a parameter in the daytime style migration model and a weight of a parameter in the night style migration model, to obtain a fused style migration model of a style between the daytime style and the night style (for example, a dusk style). The electronic device may separately perform style migration on the plurality of frames of images in the third video by using the fused style migration model obtained through fusion. In the fused style migration model for performing style migration on each frame of image, the weight of the parameter in the daytime style migration model and the weight of the parameter in the night style migration model may change. Therefore, the fourth video obtained by processing by using the fused style migration model may present a process in which the first scenery changes gradually quickly from daytime to night. In other words, a video shot by the user in a short time may also have a time-lapse effect of long-time video shooting.

This application relates to application of a neural network. For ease of understanding, the following describes terms related to a neural network that may be used in embodiments of this application.

1 Neural Network

The neural network may be composed of neural units. The neural unit may be an operation unit that uses $x_s$ and an intercept 1 as an input. For output of the operation unit, refer to the following formula (1):

$$h_{W,b}(x) = f(W^T x) = f(\Sigma_{s=1}^{n} W_s x_s + b) \qquad (1)$$

Herein, s=1, 2, . . . , n, n is a natural number greater than 1, $W_s$ is a weight of $x_s$, and b is an offset of the neural unit, and f is an activation function (activation function) of the neural unit, and is used to introduce a non-linear feature into the neural network, to convert an input signal in the neural unit into an output signal. The output signal of the activation function may serve as an input of a next convolution layer.

The activation function may be a sigmoid function. The neural network is a network formed by connecting many single neural units together. To be specific, an output of a neural unit may be an input of another neural unit. An input of each neural unit may be connected to a local receptive field of a previous layer, to extract a feature of the local receptive field. The local receptive field may be an area including several neural units.

2. Convolutional Neural Network

The convolutional neural network (convolutional neuron network. CNN) is a neural network with a convolutional structure. The convolutional neural network includes a feature extractor including a convolutional layer and a sub-sampling layer. The feature extractor may be considered as a filter. A convolution process may be considered as performing convolution by using a trainable filter and an input image or a convolution feature plane (feature map). The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units at a same feature plane share a weight, and the weight shared herein is a convolution kernel. Weight sharing may be understood as that an image information extraction manner is irrelevant to a location. A principle implied herein is that statistical information of a part of an image is the same as that of other parts. This means that image information learned in a part can also be used in another part. Therefore, the same image information obtained through learning can be used for all locations on the image. At a same convolutional layer, a plurality of convolution kernels may be used to extract different image information. Usually, a larger quantity of convolution kernels indicates richer image information reflected in a convolution operation.

The convolution kernel may be initialized in a form of a matrix of a random size. In a training process of the convolutional neural network, the convolution kernel may obtain a reasonable weight through learning. In addition, benefits directly brought by weight sharing are that connections among layers of the convolutional neural network are reduced, and an overfitting risk is reduced.

3. Loss Function

In a process of training a neural network, it is expected that an output of the neural network is as close as possible to a value that is truly expected to be predicted. Therefore, a predicted value of a current network and a target value that is truly desired may be compared, and then a weight vector of each layer of the neural network may be updated based on a difference between the predicted value of a current network and the target value that is expected to be predicted (certainly, an initialization process is usually performed before a first update, that is, a parameter is preconfigured at each layer of the neural network). For example, if a predicted value of the network is high, the weight vector is adjusted to make the prediction lower, and adjustment is continuously performed, until the neural network can predict a target value that is truly expected or a value that is very approximate to the target value that is truly expected. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A higher output value (loss) of the loss function indicates a larger difference. Therefore, training of the neural network is a process of minimizing the loss as much as possible.

4. Backpropagation Algorithm

The convolutional neural network may correct a value of a parameter in an initial super-resolution model in a training process according to an error backpropagation (backpropagation, BP) algorithm, so that an error loss of reconstructing the super-resolution model becomes smaller. Specifically, an input signal is transferred forward until an error loss occurs at an output, and the parameter in the initial super-resolution model is updated based on backpropagation error loss information, to make the error loss converge. The backpropagation algorithm is an error-loss-centered backpropagation motion intended to obtain a parameter, such as a weight matrix, of an optimal super-resolution model.

The following describes a typical photographing scenario in this application.

As shown in FIG. 1A, an electronic device 100 may include a camera 193. The camera 193 may be a front camera. The camera 193 may further include a rear camera. The electronic device 100 may display a user interface 210 shown in FIG. 1A. The user interface 210 may include an application icon display area 211 and a tray 212 with icons of frequently used applications. Details are as follows:

The application icon display area 211 may include an icon 211A of Gallery. In response to a user operation performed on the icon 211A of Gallery, for example, a touch operation, the electronic device 100 may start a gallery application, to display information such as a picture and a video stored in the electronic device 100. The picture and the video stored in the electronic device 100 include a picture and a video that are taken by the electronic device 100 by using a camera application. The application icon display area 211 may further include more application icons, for example, an icon of Mail, an icon of Music, and an icon of Sports and health. This is not limited in this embodiment of this application.

The tray 212 with icons of frequently used applications may display an icon 212A of Camera. In response to a user operation performed on the icon 212A of Camera, for example, a touch operation, the electronic device 100 may start a camera application, to perform functions such as photographing and video recording. When starting the camera application, the electronic device 100 may start the camera 193 (the front camera and/or the rear camera), to implement functions such as photographing and video recording. The tray 212 with icons of frequently used applications may further display more application icons, for example, an icon of Dial, an icon of Messages, and an icon of Contacts. This is not limited in this embodiment of this application.

The user interface 210 may further include more or less content, for example, a control for displaying a current time and date, a control for displaying weather, and the like. It may be understood that FIG. 1A only shows an example of the user interface on the electronic device 100, and should not constitute a limitation on this embodiment of this application.

Figure 1B:
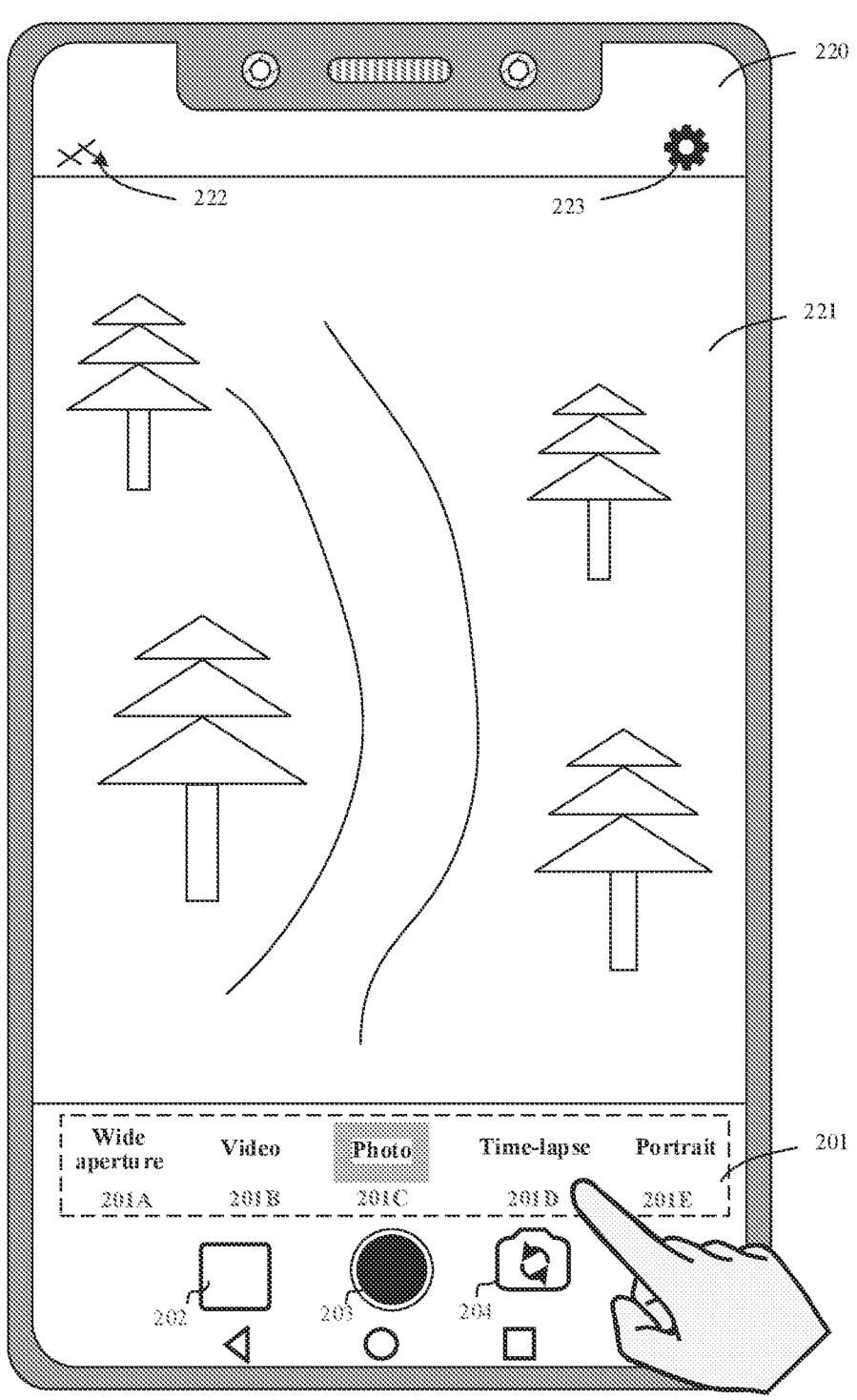

In response to a user operation performed on the icon 212A of Camera, the electronic device 100 may display a user interface 220 shown in FIG. 1B. The user interface 220 may include a preview area 221, a flash control 222, a setting control 223, a camera mode option 201, a gallery shortcut control 202, a shutter control 203, and a camera flipping control 204. Details are as follows:

The preview area 221 may be used to display an image collected by the camera 193 in real time. The electronic device may refresh display content in the preview area 221 in real time, so that a user previews the image currently collected by the camera 193.

The flash control 222 may be configured to turn on or turn off a flash.

The setting control 223 may be configured to adjust a parameter (for example, resolution or a filter) of a photographed photo, enable or disable some photographing manners (for example, scheduled photographing, smile snapshot, and audio control photographing), and the like. The setting control 223 may be used to set more other photographing functions. This is not limited in this embodiment of this application.

One or more shooting mode options may be displayed in the camera mode option 201. The one or more shooting mode options may include a "Wide aperture" mode option 201A, a "Video" mode option 201B, a "Photo" mode option 201C, a "Time-lapse" mode option 201D, and a "Portrait" mode option 201E. The one or more shooting mode options may be represented as text information on an interface, for example, "Wide aperture", "Video". "Photo", "Time-lapse", and "Portrait". This is not limited thereto. The one or more image shooting options may alternatively be represented as icons or interactive elements (interactive element, IE) in other forms on the interface. When detecting a user operation performed on the shooting mode option, the electronic device 100 may enable a shooting mode selected by the user. Not limited to those shown in FIG. 1B, the camera mode option 201 may further include more or fewer shooting mode options. The user may browse other shooting mode options by sliding left/right in the camera mode option 201.

The gallery shortcut control 202 may be used to start the gallery application. In response to a user operation performed on the gallery shortcut button 202, for example, a tap operation, the electronic device 100 may start the gallery application. In this way, the user can conveniently view a photographed photo and video without exiting the camera application and then starting the gallery application. The gallery application is an image management application on an electronic device such as a smartphone or a tablet computer, and may also be referred to as "Album". A name of the application is not limited in this embodiment. The gallery application may support the user in performing various operations on a picture stored on the electronic device 100, for example, operations such as browsing, editing, deleting, and selecting.

The shutter control 203 may be configured to listen to a user operation that triggers photo-taking. The electronic device 100 may detect a user operation performed on the shutter control 203, and in response to the operation, the electronic device 100 may save an image in the preview area 221 as a picture in the gallery application. In addition, the electronic device 100 may further display a thumbnail of the saved image in the gallery shortcut button 203. In other words, the user may tap the shutter control 203 to trigger photo-taking. The shutter control 203 may be a button or a control in another form.

The camera flipping control 204 may be configured to listen to a user operation that triggers flipping of the camera. The electronic device 100 may detect a user operation performed on the camera flipping control 204, for example, a tap operation. In response to the operation, the electronic device 100 may flip a camera used for photographing, for example, switch a rear camera to a front camera, or switch a front camera to a rear camera.

The user interface 221 may further include more or less content. This is not limited in this embodiment of this application.

The following describes some user interfaces when the electronic device 100 performs time-lapse photographing.

FIG. 1C to FIG. 1F show examples of user interfaces for performing time-lapse photographing by the electronic device 100.

Figure 1C:
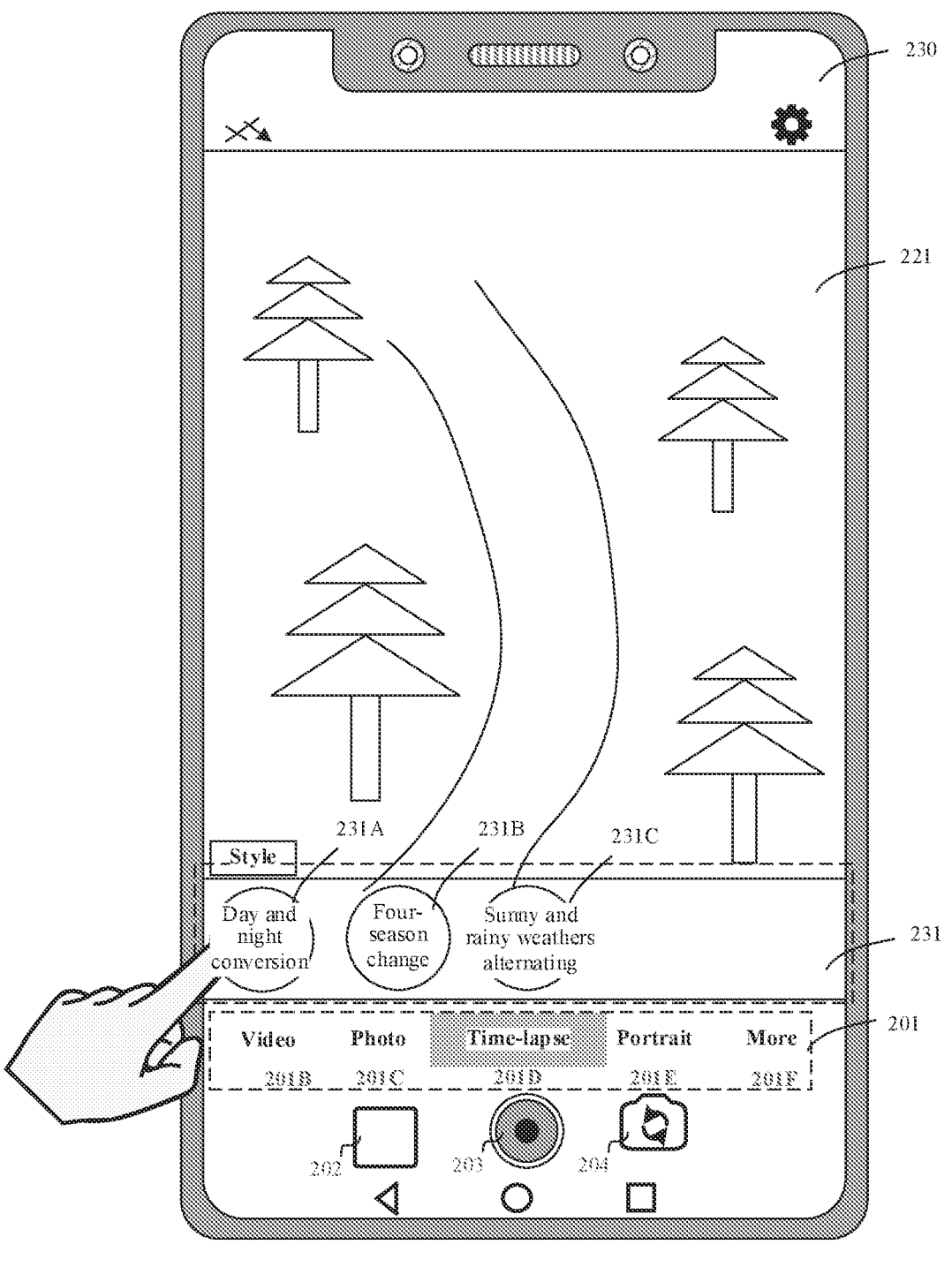

As shown in FIG. 1B, the electronic device 100 may display, in response to a user operation performed on the "Time-lapse" mode option 201D, a user interface 230 shown in FIG. 1C. Basic controls included in the user interface 230 are basically the same as those included in the user interface 210. In addition, the user interface 230 may include a style option 231.

The style option 231 may include one or more style options. For example, a "Day and night conversion" style option 231A, a "Four-season change" style option 231B, and a "Sunny and rainy weathers alternating" style option 231C. The one or more style options may be represented as text information on the interface. For example, "Day and night conversion", "Four-season change", and "Sunny and rainy weathers alternating". This is not limited thereto. The one or more style options may alternatively be represented as icons or interaction elements in other forms on the interface. Each style option may be used to instruct the electronic device 100 to perform style migration on a shot time-lapse video, to convert a style of the video to a style corresponding to the style option.

For example, a style migration model corresponding to the "Day and night conversion" style option 231A may be a fused style migration model obtained by fusing a daytime style migration model and a night style migration model. The electronic device 100 may perform style migration on a plurality of frames of images in the video by using the fused style migration model, to obtain a video that can present a process in which shot content changes gradually quickly from daytime to night. A style migration model corresponding to the "Four-season change" style option 231B may be a fused style migration model obtained by using a spring style migration model, a summer style migration model, an autumn style migration model, and a winter style migration model. The electronic device 100 may perform style migration on the plurality of frames of images in the video by using the fused style migration model, to obtain a video that can present a process in which shot content changes gradually quickly from spring to summer, from summer to autumn, and then from autumn to winter. A style migration model corresponding to the foregoing "Sunny and rainy weathers alternating" style option 231C may be a fused style migration model obtained by fusing a sunny style migration model and a rainy style migration model. The electronic device 100 may perform style migration on the plurality of frames of images in the video by using the fused style migration model, to obtain a video that can present a process in which shot content changes gradually quickly from a sunny day to a rainy day.

The style option 231 may further include more or fewer style options. This is not limited to the fused style migration style model shown in FIG. 1C. The style option 231 may also include a single-style migration model (for example, a cartoon style migration model).

In this embodiment of this application, a specific manner of changing the style of the video obtained by performing style migration by using the fused style migration model is not limited. For example, when receiving that a style selected by the user is a day and night conversion style, the electronic device 100 may alternatively perform style migration processing on the video, so that video presents a process in which shot content changes gradually quickly from night to daytime in a playback process of the video.

Figure 1D:
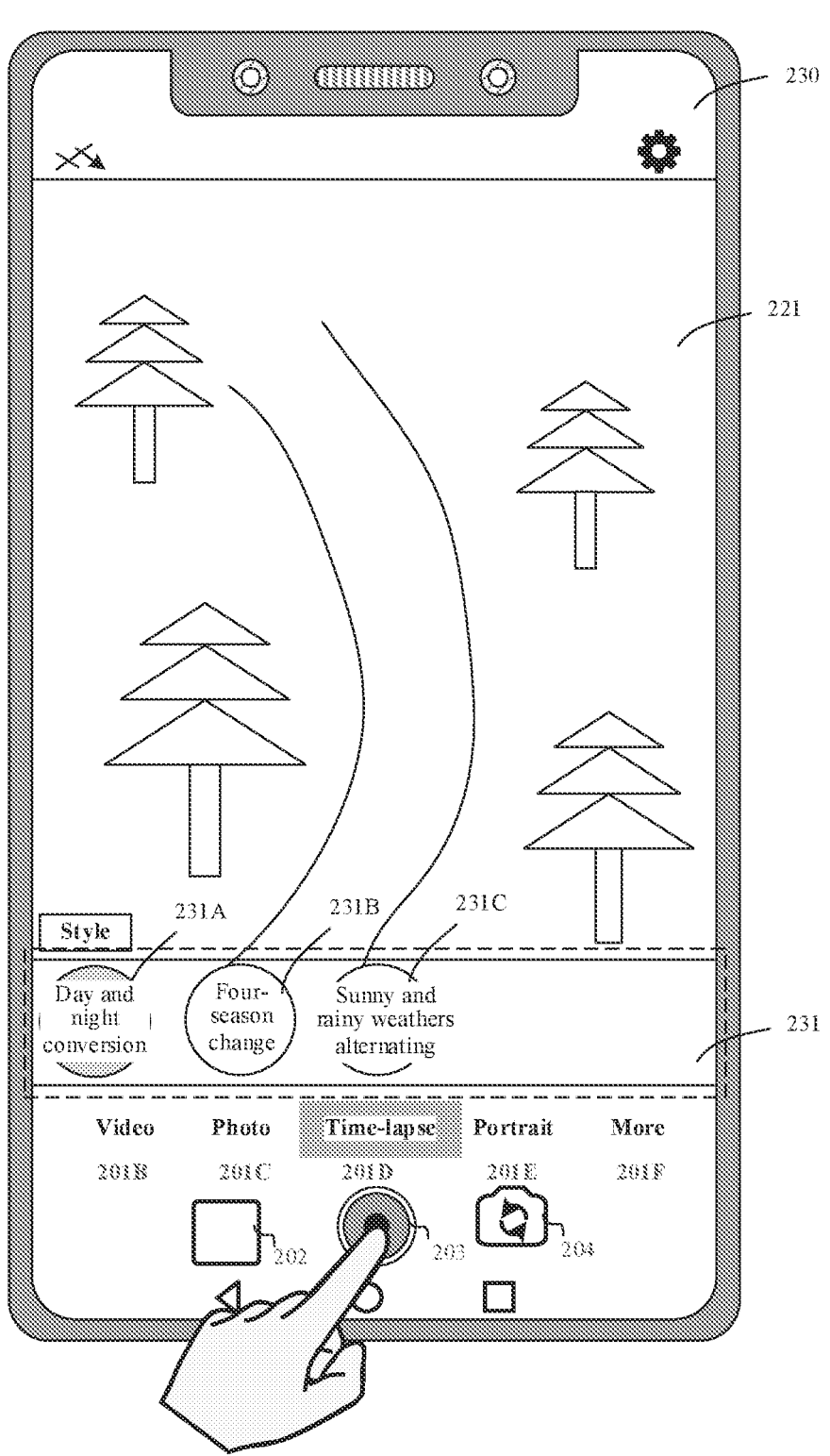

As shown in FIG. 1C, all of the "Day and night conversion" style option 231A, the "Four-season change" style option 231B, and the "Sunny and rainy weathers alternating" style option 231C are in unselected states. For example, colors of the foregoing style options are all white. In response to a user operation performed on the "Day and night conversion" style option 231A, for example, a touch operation, the electronic device 100 may display a user interface 230 shown in FIG. 1D. In FIG. 1D, the "Day and night conversion" style option 231A may be presented in a selected state. For example, the color of the "Day and night conversion" style option 231A may become gray. In this embodiment of this application, a manner of presenting the style option in an unselected state and a selected state is not limited.

Figure 1E:
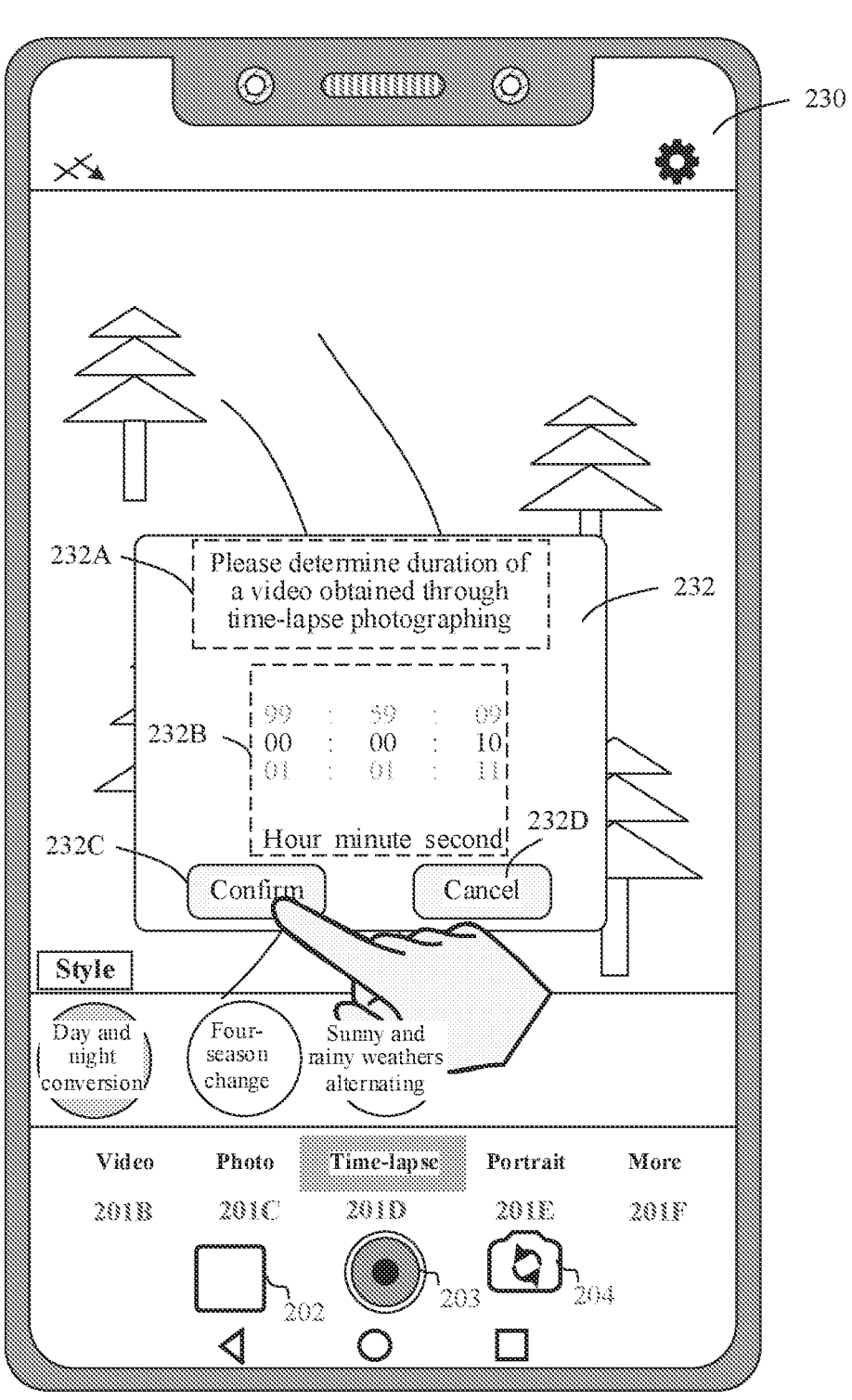

In response to a user operation performed on the shutter control 203, for example, a touch operation, the electronic device 100 may display a user interface 230 shown in FIG. 1E. In FIG. 1E, the user interface 230 may include a time selection box 232. The time selection box 232 may be used by the user to select a time length of a generated time-lapse video. The time selection box 232 may include a prompt 232A, a time option 232B, a "Confirm" control 232C, and a "Cancel" control 232D. Details are as follows:

The prompt 232A may be used to prompt the user to select a time length of the generated time-lapse video. For example, the prompt 232A may include a text prompt "Please determine duration of a video obtained through time-lapse photographing".

The time option 232B may be used by the user to select the time length of the time-lapse video, for example, 10 seconds.

The "Confirm" control 232C may be configured to instruct the electronic device 100 to start time-lapse photographing. The electronic device 100 may store a time length indicated by the time option 232B. Further, the electronic device 100 may process the shot video, to obtain a time-lapse video of which a time length is the time length indicated by the time option 232B (that is, the time length selected by the user).

The "Cancel" control 232D may be used by the user to cancel the selection of the time length of the time-lapse video. In response to a user operation performed on the "Cancel" control 232D, the electronic device 100 may display a user interface 230 shown in FIG. 1D.

A specific representation form of the time selection box is not limited in this embodiment of this application.

Before starting to perform time-lapse photographing, the electronic device 100 may obtain a time length of a time-lapse video that the user expects to generate. After an original video is obtained through shooting, the electronic device may perform frame extraction on the original video, so that a time length of the generated time-lapse video is the time length expected by the user. In some embodiments, the electronic device may determine, by providing a time-lapse rate, a rate of collecting an image during photographing or a frame extraction ratio of the original video obtained through shooting. However, in this manner, a maximum time-lapse rate that can be provided by the electronic device is usually limited. When a shooting time is excessively long, the time length of the time-lapse video generated by the electronic device is still long, and a time-lapse effect presented by the time-lapse video is not obvious. Compared with the implementations in the foregoing embodiment, in some embodiments of this application, the frame extraction ratio determined during time-lapse photographing may be determined based on an actual shooting time length and a time length indicated by the time option 232B. That is, the user may define the frame extraction ratio for the original video by selecting the time length of the time-lapse video expected to be generated from the time option 232B.

As shown in FIG. 1E, a time length indicated by the time option 232B is 10 seconds. In response to a user operation performed on the "Confirm" control 232C, the electronic device 100 may display a time-lapse photographing interface 240 shown in FIG. 1F. The time-lapse photographing interface 240 may include a preview area 221, a shooting time indicator 241, and a shooting stop control 205. Details are as follows:

The preview area 221 may display an image captured by the electronic device 100 by using the camera when time-lapse photographing is performed. When ending the time-lapse photographing, the electronic device 100 may store a series of images that are sequentially displayed in the preview area 221 in a time-lapse photographing process (that is, a time period from starting time-lapse photographing to ending time-lapse photographing) as the original video. In this way, the electronic device 100 may perform processing such as image stabilization processing, frame extraction processing, and style migration on the original video to obtain the time-lapse video.

Figure 1F:
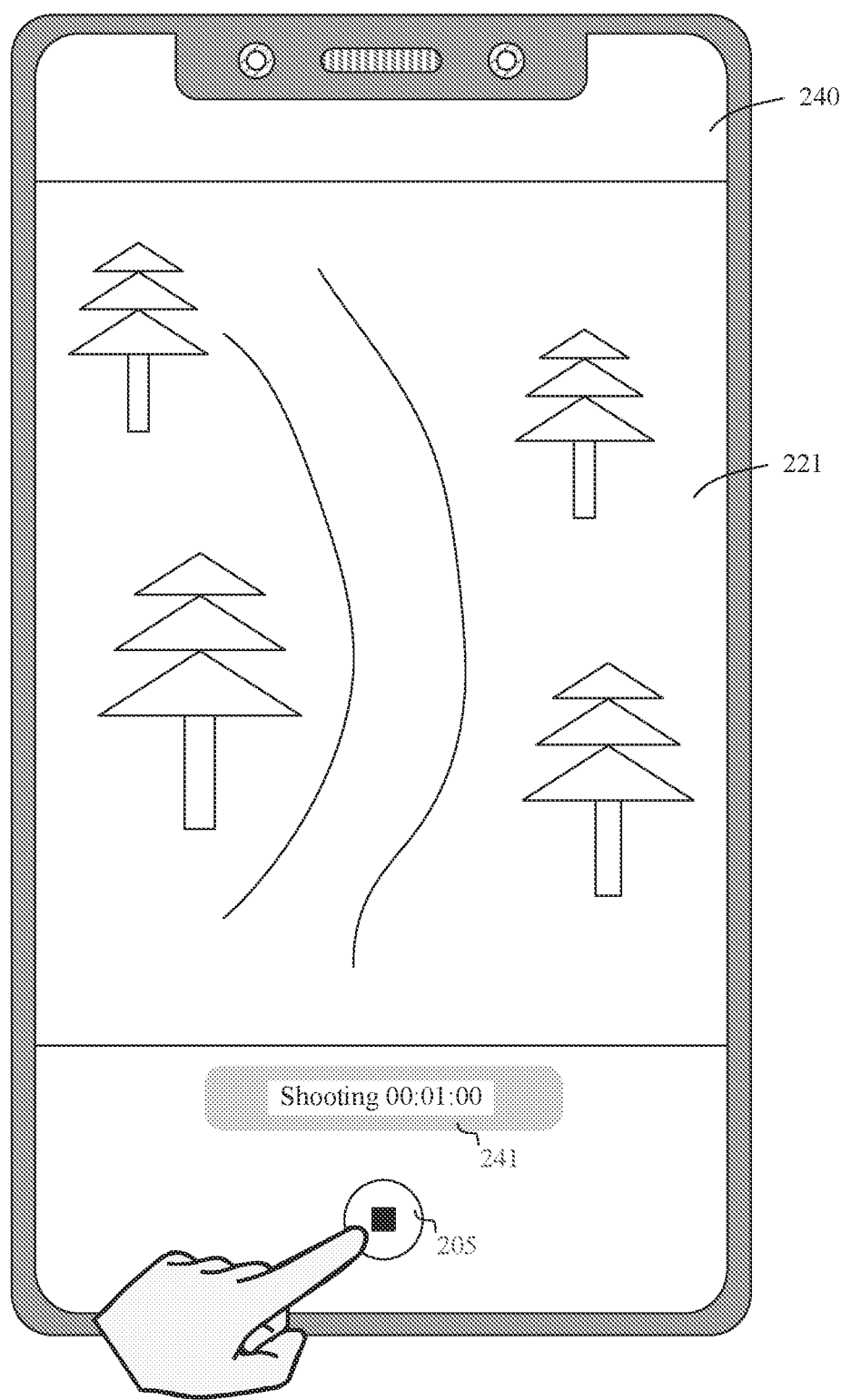

The shooting time indicator 241 may be used to indicate a time length of shooting that is taken by the electronic device 100 to perform time-lapse photographing. As shown in FIG. 1F, the shooting time indicator 241 includes "00: 01:00", which may indicate that the electronic device 100 has performed time-lapse photographing for one minute.

The shooting stop control 205 may be configured to end time-lapse photographing. As shown in FIG. 1F, when the shooting time length is one minute, in response to a user operation performed on the shooting stop control 205, the electronic device 100 may end time-lapse photographing. The electronic device 100 may obtain an original video of which a time length is one minute.

The electronic device 100 may perform, based on a style selected by the user and the time length of the time-lapse video expected to be generated, image stabilization processing, frame extraction processing, and style migration on the original video to obtain the time-lapse video.

Figure 2A:
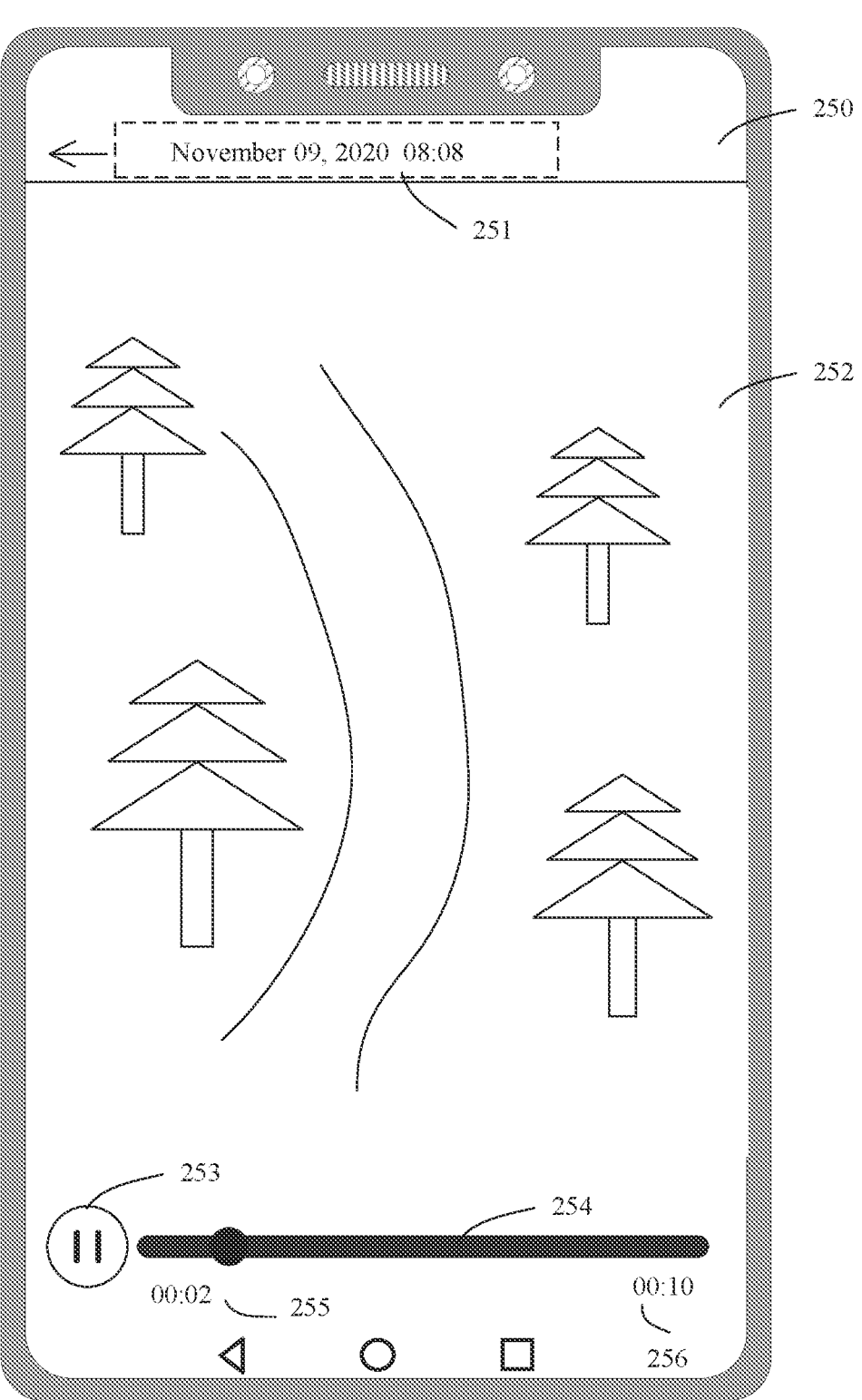
FIG. 2A to FIG. 2C are schematic diagrams of some user interfaces for playing a time-lapse video according to an embodiment of this application.
Figure 2B:
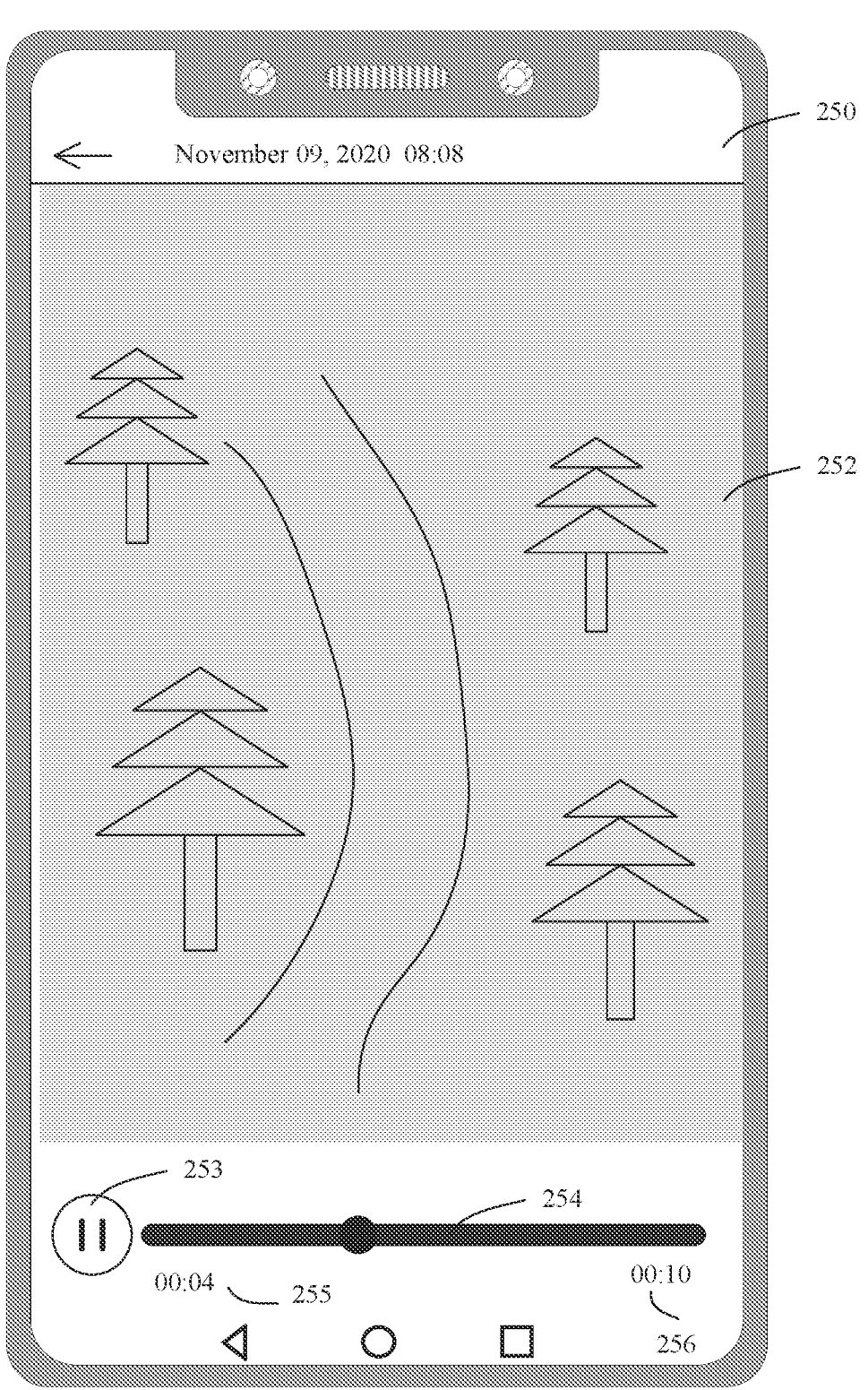
Figure 2C:
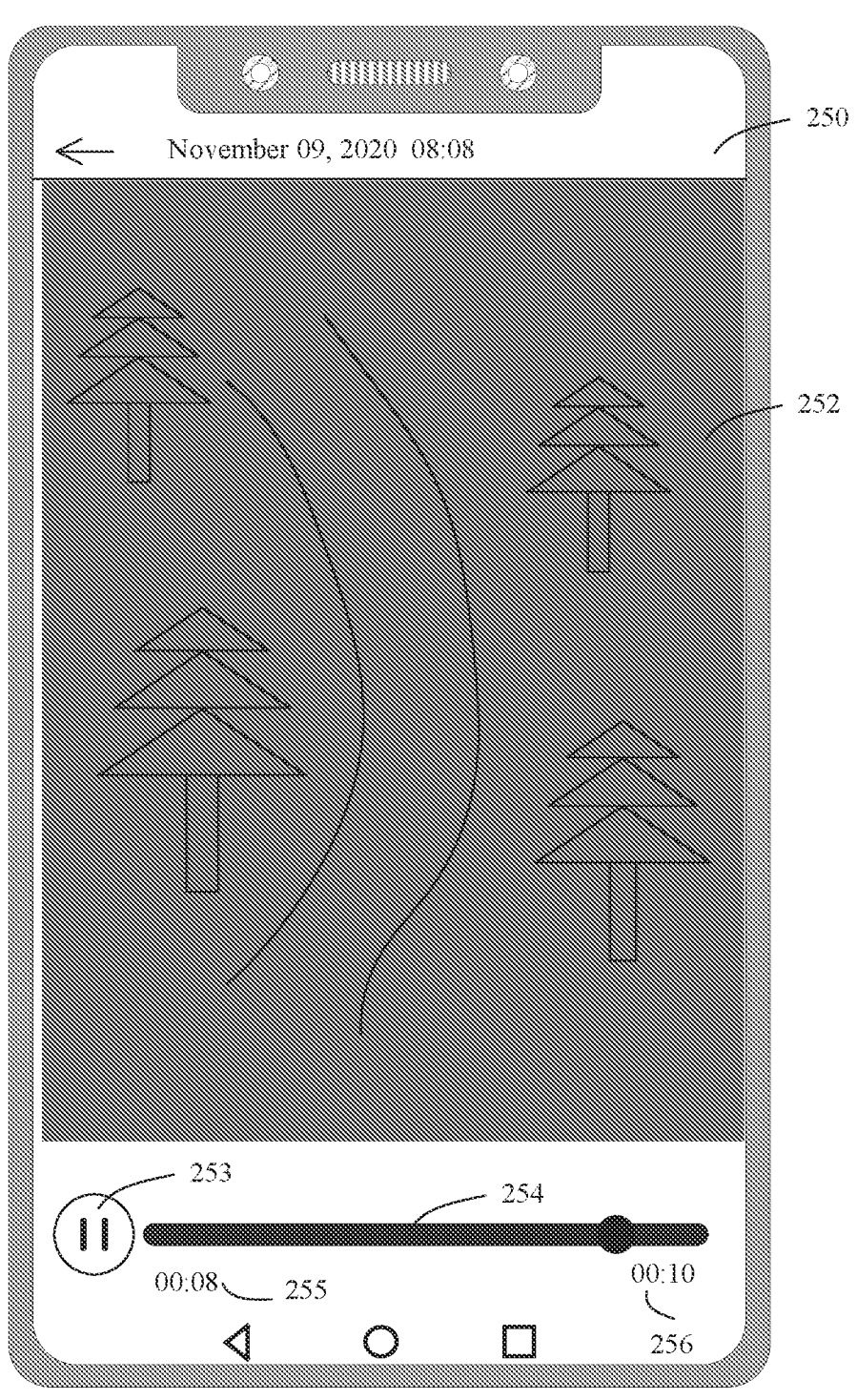

For example, FIG. 2A to FIG. 2C show a user interface of playing, by the electronic device 100, the time-lapse video obtained in a shooting process shown in FIG. 1C to FIG. 1F.

When playing the time-lapse video, the electronic device 100 may display the video playback interface 250 shown in FIG. 2A. The video playback interface 250 may include a time control 251, an image display area 252, a pause control 253, a progress bar 254, video playback time 255, and total video duration 256. Details are as follows:

The time control 251 may indicate a time, for example, at 8:08 a.m. on Nov. 9, 2020, at which the electronic device 100 stores the time-lapse video.

The image display area 252 may be used to display a frame of image included in the time-lapse video.

The pause control 253 may be used to pause playing of the time-lapse video.

The progress bar 254 may be used to compare video playback time and total video duration, to indicate a video playback progress.

The video playback time 255 may be used to indicate a time that the video is played.

The total video duration 256 may be used to indicate the total duration of the time-lapse video. It can be learned from FIG. 2A that the total duration of the time-lapse video is 10 seconds. To be specific, the electronic device 100 processes, based on the time length indicated by the time option 232B shown in FIG. 1E, a video of which a shooting time length is one minute as the time-lapse video of which the time length is 10 seconds. In this case, the electronic device 100 may present, within 10 seconds, content shot within one minute.

It can be seen from the video playback process shown in FIG. 2A to FIG. 2C that the time-lapse video undergoes style migration. The electronic device 100 may separately perform, based on a style option selected by the user, style migration on a plurality of frames of images in the video by using a corresponding style migration model. For example, based on the "Day and night conversion" style option 231A, the electronic device 100 may perform style migration on the video by using a fused style migration model that fuses a daytime style migration model and a night style migration model. The time-lapse video obtained through the foregoing style migration may present a process in which shot content changes gradually rapidly from daytime to night.

In FIG. 2A to FIG. 2C, an image included in the time-lapse video retains high-layer semantic information (such as a tree or a river) of an image included in the original video. However, a style of a $1^{st}$ frame image to a last frame image in the time-lapse video gradually changes from a daytime style to a night style. As shown in FIG. 2A, when the time-lapse video is played to a $2^{nd}$ second, an image style is the daytime style. That is, when a play time of the time-lapse video is the $2^{nd}$ second, an image may present a scene of the shot content (such as a tree or a river) in the daytime. As shown in FIG. 2B, when the time-lapse video is played to a $4^{th}$ second, an image style is a style between a daytime style and a night style (for example, a dusk style). That is, an image of the time-lapse video when the playback time is the $4^{th}$ second may present a scene of the shot content (such as the tree or the river) at dusk. As shown in FIG. 2C, when the time-lapse video is played to an $8^{th}$ second, the image style is the night style. That is, when the playback time of the time-lapse video is the $2^{nd}$ second, the image may present a scene of the photographed content (such as a tree or a river) at night.

FIG. 2A to FIG. 2C are only examples of gradually changing an image style from the daytime style to the night style, and do not limit specific presentation content of an image of a corresponding style.

It can be learned from the foregoing embodiment of shooting and playing the time-lapse video that a video shot by a user in a short time may have a time-lapse effect of long-time video shooting. For example, the time-lapse video shot by the user within one minute may have a time-lapse effect of changing gradually quickly from daytime to night that originally needs to be shot for 12 hours or even longer. In addition, the electronic device may perform image stabilization processing on a shot video. In this way, when shooting a time-lapse video, the user may hold the electronic device to perform shooting, and no fixing device is required to fix the electronic device used for shooting in one place. In the foregoing image processing method, time-lapse photographing breaks through limitations on a shooting scene, a device, and a time, and convenience and interest of performing time-lapse photographing by a user are improved.

The following specifically describes an implementation of performing image stabilization processing by the electronic device 100 in this embodiment of this application.

Shaking of a shot video is generally caused by a pose change of the electronic device used for shooting in a shooting process. The electronic device may process each frame of image in the video by calculating the pose change of the electronic device in the shooting process, to eliminate shaking. Specifically, the electronic device 100 may use a motion sensor (for example, a gyroscope sensor or an acceleration sensor) to calculate a pose change of the electronic device 100 in a shooting process. The electronic device 100 may determine an original motion path in a shooting process based on the pose change of the electronic device 100. Further, the electronic device 100 may perform smoothing processing on the original motion path (that is, eliminates a shaking part on the motion path), to obtain the pose change of the electronic device 100 in a stable shooting state. Based on a transformation relationship between an actual pose when the electronic device 100 collects a frame of image and a pose when the electronic device 100 collects the frame of image in the stable shooting state, the electronic device 100 may perform image registration on the frame of image, to obtain coordinates corresponding to pixels of the frame of image in the stable shooting state. The electronic device 100 may connect frames of images that have undergone image registration in series in an order of collection time, to obtain a more stable video.

In addition to the foregoing implementation of electronic image stabilization, the electronic device 100 may further reduce or eliminate shaking of a shot video by using an optical image stabilization method. For example, a lens group of the camera of the electronic device 100 includes a magnetic suspension lens. In a shooting process, the electronic device 100 may detect shaking by using the motion sensor. The electronic device 100 may control the magnetic suspension lens based on a measurement value of the motion sensor, to compensate for an optical path, to avoid shaking of the optical path. In this way, the electronic device 100 can reduce or eliminate shaking of a shot video.

In some embodiments, the electronic device 100 may further perform image stabilization processing by combining the electronic image stabilization method with the optical image stabilization method.

A method for performing image stabilization processing by the electronic device 100 is not limited in this embodiment of this application. For the foregoing image stabilization processing method, refer to another video stabilization method in the conventional technology.

The following specifically describes an implementation in which the electronic device 100 fuses a plurality of style migration models and performs style migration on a video by using a fused style migration model in an embodiment of this application.

1. Fuse a Plurality of Style Migration Models

Figure 3:
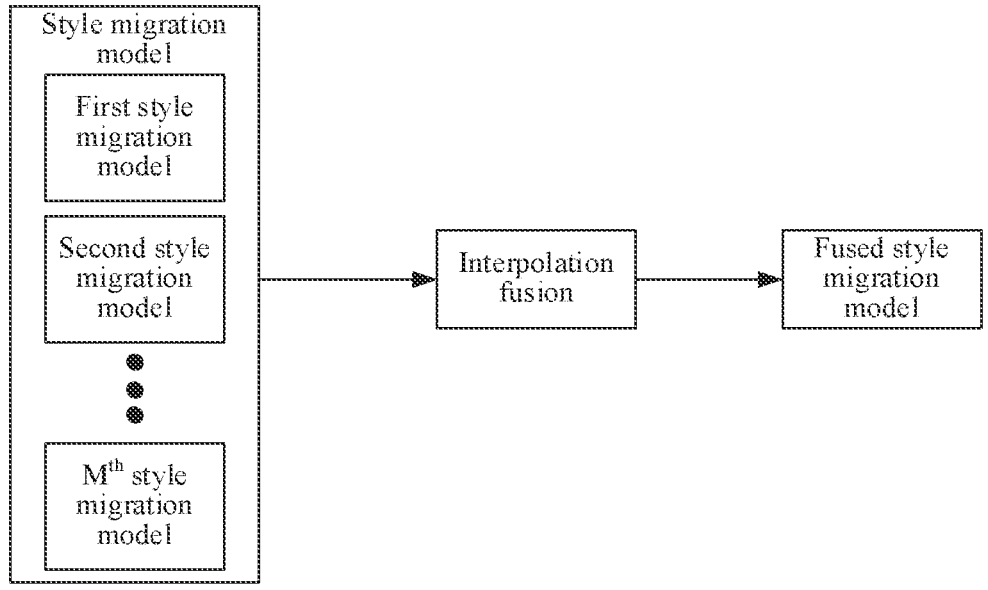
FIG. 3 is a schematic diagram of a method for obtaining a fused style migration model by an electronic device according to an embodiment of this application.

FIG. 3 shows an example of a flowchart of fusing M style migration models by an electronic device 100. M is a positive integer greater than or equal to 2. Details are as follows:

A first style migration model, s second style migration model, . . . , and an $M^{th}$ style migration model are all trained style migration models, and all correspond to single styles. For example, a style corresponding to the first style migration model is a night style. In this case, the first style migration model may change a style of an input image to the night style.

The M style migration models may be specifically neural network models, for example, convolutional neural network models. In addition, network structures of the M style migration models are the same.

The electronic device 100 may fuse the M style migration models into one fused style migration model with a specific style by using an interpolation fusion method. Specifically, the electronic device 100 may perform interpolation fusion on parameters at a same location of the M style migration models, and use a parameter obtained after interpolation fusion as a parameter of the fused style migration model at this location.

For a method for performing, by the electronic device 100, interpolation fusion on the parameters at the same location in the M style migration models, refer to the following formula (2):

$$\theta_{interp} = \alpha\theta_1 + \alpha_2\theta_2 + \ldots + \alpha_i\theta_i + \ldots + \alpha_M\theta_M \quad (2)$$

Herein, i is a positive integer that is greater than or equal to 1 and less than or equal to M. $\theta_i$ may represent a parameter of an $i^{th}$ style migration model at a first location. The first location may be any location in the $i^{th}$ style migration model. The parameter may be, for example, an offset b of a neural unit in the $i^{th}$ style migration model and a weight $W_s$ of each neural unit at an upper layer of the neural unit. $\alpha_i$ may represent a fusion weight of the $i^{th}$ style migration model. $\alpha_i$ is greater than or equal to 0, and $\alpha_1 + \alpha_2 + \ldots + \alpha_i + \ldots + \alpha_M = 1$. A value of $\alpha_i$ is not limited in this embodiment of this application. $\theta_{interp}$ may represent a parameter obtained after interpolation fusion, namely, a parameter of the fused style migration model at the first location.

According to the foregoing formula (2), the electronic device 100 may determine a value of a parameter of the fused style migration model at each location, to obtain the fused style migration model into which the M style migration models are fused. It may be understood that a network structure of the fused style migration model is the same as network structures of the M style migration models. The first location of the $i^{th}$ style migration model and the first location of the fused style migration model are a same location in a same network structure.

Herein, an example in which the electronic device 100 fuses a daytime style migration model and a night style migration model is specifically used for description.

For a calculation formula of the parameter that is of the fused style migration model obtained through fusion and that is at the first location, refer to the following formula (3):

$$\theta_{interp} = \alpha_{day}\theta_{day} + \alpha_{night}\theta_{night} \quad (3)$$

Herein, $\alpha_{day}$ and $\alpha_{night}$ may respectively represent fusion weights of the daytime style migration model and the night style migration model. $\alpha_{day}$ and $\alpha_{night}$ are positive numbers greater than or equal to 0, and $\alpha_{day} + \alpha_{night} = 1$. $\delta_{day}$ and $\theta_{night}$ may respectively represent parameters of the day style migration model and the night style migration model at the first location.

It may be understood that the style corresponding to the fused style migration model is a style between the daytime style and the night style, and is determined by values of $\alpha_{day}$ and $\alpha_{night}$. A larger value of $\alpha_{day}$ indicates a smaller value of $\alpha_{night}$, and the style corresponding to the fused style migration model is closer to the daytime style. A smaller value of $\alpha_{day}$ indicates a larger value of $\alpha_{night}$, and the style corresponding to the fused style migration model is closer to the night style.

When performing style migration on a plurality of frames of images in a video by using the fused style migration model, the electronic device 100 may obtain, by changing values of $\alpha_{day}$ and $\alpha_{night}$, a video that can present a time-lapse effect of changing gradually rapidly from daytime to night. Specifically, in the fused style migration model in which style migration is performed on a 1$^{st}$ frame of image to a last frame of image of the video, a value of $\alpha_{day}$ may gradually decrease, and a value of $\alpha_{night}$ gradually increases.

For example, the video includes n frames of images, and n is an integer greater than 1. In a fused style migration model in which the electronic device 100 performs style migration on a j$^{th}$ frame of image in the n frames of images, for a calculation formula of the parameter at the first location, refer to the following formula (4):

$$\theta_{j\_interp} = \frac{n-j+1}{n}\theta_{day} + \frac{j-1}{n}\theta_{night} \qquad (4)$$

Herein, j is an integer greater than or equal to 1 and less than or equal to n. The first location is any location in the fused style migration model.

2. Perform Style Migration on a Video by Using the Fused Style Migration Model

When performing style migration on a plurality of frames of images in a video by using the fused style migration model, the electronic device 100 may adjust a weight occupied by the fused style migration model, so that the video presents an effect of gradually changing from one style to another style. If a style of an output image of the fused style migration model is closer to a style of an output image of one fused style migration model, a weight occupied by the fused style migration model is larger.

The electronic device 100 may determine, based on a style option in the foregoing embodiment, the fused style migration model. For example, the style option is the "Day and night conversion" style option. The electronic device 100 may determine that the fused style migration model includes a daytime style migration model and a night style migration model. After the electronic device performs style migration on a video by using the fused style migration model in which the daytime style migration model and the night style migration model are fused, a style of an image included in the video may gradually change from a daytime style to a night style. In other words, in a playback process of the video on which the style migration is performed, a time change of a scenery in the video from daytime to night may be presented.

Figure 4:
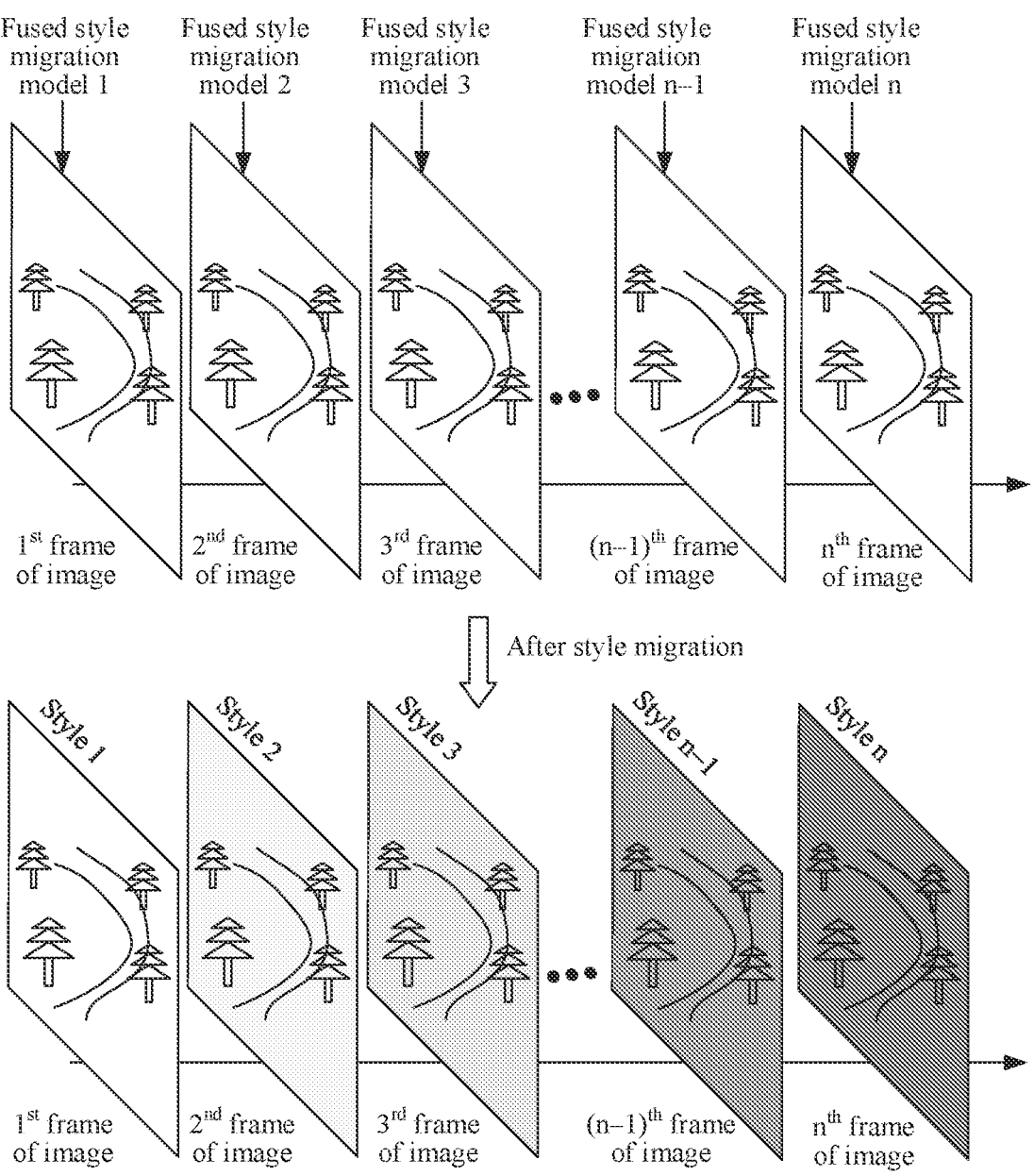
FIG. 4 is a schematic diagram of a method for performing style migration on a video by an electronic device by using a fused style migration model according to an embodiment of this application.

FIG. 4 shows an example of an implementation in which the electronic device 100 performs style migration on a video by using a fused style migration model in which a daytime style migration model and a night style migration model are fused.

The electronic device 100 may perform interpolation fusion on the daytime style migration model and the night style migration model according to the foregoing formula (4).

As shown in FIG. 4, the video includes n frames of images. A model for performing style migration on a j$^{th}$ frame of image in the n frame of images may be a fused style migration model j. A parameter of the fused style migration model j at a first location may be $((n-j+1)/n)\theta_{day}+((j-1)$ $\theta_{night}$. The electronic device 100 may calculate parameters of the fused style migration model j at all locations, to obtain the fused style migration model j.

The electronic device 100 may separately perform style migration on the 1$^{st}$ frame of image to the n$^{th}$ frame of image by using a fused style migration model 1 to a fused style migration model n. The styles corresponding to the convergent style migration model 1 to the fused style migration model n are respectively a style 1 to a style n. It can be learned from the foregoing formula (4) that the fused style migration model 1 may be a daytime style migration model. The style 1 may be a daytime style. The fused style migration model n may be a night style migration model. The style n may be a night style.

It can be learned from FIG. 4 that the styles of the 1$^{st}$ frame of image to the n$^{th}$ frame of image are respectively the style 1 to the style n. The styles of the 1$^{st}$ frame of image to the n$^{th}$ frame of image gradually change from the daytime style to the night style. A video that has undergone style migration may present an effect of changing gradually rapidly from daytime to night in a playback process.

In some embodiments, a quantity of fused style migration models obtained by the electronic device 100 by using the M style migration models may be less than a quantity of frames of images in a video on which style migration needs to be performed. One fused style migration model may perform style migration on one frame of image or a plurality of consecutive frames of images in the video on which style migration needs to be performed.

The following describes a method for implementing training a style migration model according to an embodiment of this application.

A device for training the style migration model may be a training device. A style migration model obtained through training is a style migration model corresponding to one style, for example, a style migration model corresponding to a night style. The following describes how to train a night style migration model.

In a possible implementation, a training set used to train the night style migration model may include a content image on which style migration needs to be performed and a night style image. The training device may input the content image into the to-be-trained night style migration model, to obtain a composite image. Further, the training device may calculate a loss of a loss function. The loss may be used to indicate a difference between a style of the composite image and a style of the night style image, and a difference between content of the composite image and that of the content image that is input into the night style migration model in terms of high-level semantic information. A large value of the loss indicates a large difference between a style of the composite image and a style of the night style image and a large difference between the content of the composite image and that of the image that is input into the night style migration model in terms of high-level semantic information. The training device may adjust parameters in the to-be-trained night-style migration model based on the loss obtained through calculation by using a backpropagation algorithm. The training device adjusts the parameter in the to-be-trained night style migration model in a direction in which a value of the loss is small (that is, a small difference between the style of the composite image and the style of the night style image indicates a small difference between the content of the composite image and that of the content image that is input into the night style migration model in terms of the high-level semantic information). When the value of the loss is less than a preset threshold, the training device may obtain a trained night style migration model.

Compared with performing style migration on a single frame of image, performing style migration on a plurality of frames of images included in a video requires to consider that the plurality of frames of images in the video are continuous. After style migration is performed on the plurality of frames of images included in a video by using the style migration model obtained by using the training method in the foregoing implementation, a style hop may occur between two adjacent frames of composite images. In this case, unexpected blinking may occur in a video playback process. To improve consistency of image style effects of a plurality of consecutive frames of content images in a video and reduce a blinking phenomenon in the video playback process, the training device may consider a relationship between the plurality of consecutive frames of content images when training the style migration model. Specifically, when training the style migration model, the training device may introduce a multi-frame time domain loss into the loss function.

FIG. 5 is an example of a flowchart of a style migration model training method. The method may be particularly suitable for training a style migration model for style migration of a video. As shown in FIG. 5, the training method may include steps S101 to S104. In the training method, a training set used to train a style migration model may include a video on which style migration needs to be performed. Details are as follows:

S101: A training device inputs an $r^{th}$ frame of content image of a video into a to-be-trained style migration model, and calculates a loss loss_cur corresponding to the $r^{th}$ frame of content image.

The training device may sequentially train the style migration model by using a $1^{st}$ frame of content image to a last frame of content image in the video. For a method for calculating the loss corresponding to the content image of the $r^{th}$ frame, refer to descriptions in the foregoing implementation.

S102: The training device obtains first h frames of content images of the $r^{th}$ frame of content image, and inputs the h frames of content images into the to-be-trained style migration model to obtain h frames of composite images.

The r and h are both positive integers, and h is less than r.

S103: The training device calculates a difference between each of the h frames of composite images and a composite image obtained by inputting the $r^{th}$ frame of content image into the to-be-trained style migration model, to obtain a multi-frame time domain loss $L_{ct}$.

The training device may calculate the multi-frame time domain loss $L_{ct}$ with reference to the following formula (5).

$$L_{ct}(N, f_{cur}, f_{pre}) = \sum_{i=1}^{h} \lambda_{pre\_i} \|N(f_{cur}) - N(f_{pre\_i})\|_1 \qquad (5)$$

Herein, N may represent a to-be-trained style migration model, $f_{cur}$ may represent a current frame of content image used for training the style migration model, that is, the $r^{th}$ frame of content image of a video. $N(f_{cur})$ may represent a content image obtained by inputting the $r^{th}$ frame of content image into the to-be-trained style migration model, $f_{pre\_i}$ may represent a previous $i^{th}$ frame of content image of the $r^{th}$ frame of content image. $N(f_{pre\_i})$ may represent a content image obtained by inputting the previous $i^{th}$ frame of content image of the $r^{th}$ frame of content image into the to-be-trained style migration model. $\lambda_{pre\_i}$ may represent a weight coefficient corresponding to the previous $i^{th}$ frame of content image of the $r^{th}$ frame of content image. $\lambda_{pre\_i}$ greater than or equal to 0, and $\lambda_1 + \ldots + \lambda_{pre\_i} + \ldots + \lambda_n = 1$.

S104: The training device adjusts a parameter of the to-be-trained style migration model based on the loss loss_cur and the multi-frame time domain loss $L_{ct}$ by using a backpropagation algorithm.

The training device may use a sum of the loss_cur and the multi-frame time domain loss $L_{ct}$ as a corresponding loss when an input of the to-be-trained style migration model is the $r^{th}$ frame of content image, and adjust the parameter of the to-be-trained style migration model by using the backpropagation algorithm.

The training device may train the style migration model by using a plurality of videos. When a value of a loss including the multi-frame time domain loss is less than a preset threshold, the training device may obtain a trained style migration model. When the trained style migration model is used to perform style migration on a plurality of frames of images in a video, consistency of style effects of a plurality of consecutive frames of content images in the video can be improved, and a blinking phenomenon in a video playback process can be eliminated.

A method for calculating the multi-frame time domain loss is not limited to the calculation method indicated in formula (5). The training device may further calculate, by using another method, the difference between each of the h frames of composite images and the composite image obtained by inputting the $r^{th}$ frame of content image into the to-be-trained style migration model.

In addition, the training device is not limited to the first h frames of content images of the $r^{th}$ frame of content image, and may further obtain next several frames of images of the $r^{th}$ frame of content image to calculate the foregoing multi-frame time domain loss.

In some embodiments, the training device and the electronic device 100 in this application may be a same device.

It may be understood that, because the style migration model obtained through multi-frame time domain loss training can reduce a style difference between a plurality of consecutive frames of images in a video on which style migration is performed, a fused style migration model obtained by the electronic device by performing interpolation and fusion by using two or more of the style migration models can also reduce the style difference between the plurality of consecutive frames of images in the video on which style migration is performed. That is, after the electronic device performs style migration on the video by using the fused style migration model according to the method in the foregoing embodiment, styles of adjacent frames of images in the video may be smoothly migrated, and a blinking phenomenon caused by style migration of the adjacent frames of images in a video playback process is eliminated.

In some embodiments, the trained style migration model (for example, a daytime style migration model or a night style migration model) may be stored in the electronic device 100. When style migration needs to be performed on the video by using the fused style migration model, the electronic device 100 may locally obtain the style migration model for fusion.

In some other embodiments, the trained style migration model may be stored in a cloud. The electronic device 100 uploads, to the cloud, a video in which style migration needs to be performed and a selected style option (for example, the "Day and night conversion" style option 231A shown in FIG. 1D). The cloud may perform style migration on the video by using the fused style migration model, and send, to the electronic device 100, an obtained video on which the style migration is performed. Optionally, the electronic device 100 may send only the selected style option to the cloud. The cloud may send, to the electronic device 100 based on the foregoing style option, a style migration model that needs to be fused.

A storage location of the trained style migration model is not specifically limited in this embodiment of this application.

The following describes a shooting method provided in this application.

FIG. 6 is an example of a flowchart of a shooting method according to this application. The method may include steps S201 to S207. Details are as follows:

S201: An electronic device 100 starts a camera application and a camera.

In response to the user operation of starting the camera application, for example, the touch operation performed on the icon 212A of Camera shown in FIG. 1A, the electronic device 100 may start the camera application and the camera.

S202: The electronic device 100 receives a first user operation used to select a time-lapse photographing mode in a camera mode, and displays an option used to determine a style of a time-lapse video.

The camera application may include a plurality of camera modes. The plurality of camera modes are used to implement different shooting functions. The first user operation may be, for example, the user operation performed on the "Time-lapse" option 201D shown in FIG. 1B.

In response to the first user operation, the electronic device 100 may display, on a user interface, an option used to determine the style of the time-lapse video. For example, as shown in FIG. 1C, the style option 231 for performing style migration on a photographed video is shown.

The time-lapse video may be a video obtained by serially connecting, in an order of collection time, images collected by the camera in a process of performing time-lapse photographing after the images are processed in the following steps S205 to S207. The user may view, by using a gallery application, the time-lapse video obtained by the electronic device.

S203: The electronic device 100 receives a second user operation used to select a style and a time length of the time-lapse video, and stores the selected style and time length of the time-lapse video.

The foregoing second user operation may be, for example, the user operation performed on the "Day and night conversion" style option 231A shown in FIG. 1C and a user operation performed on the "Confirm" control 232C after the time is selected in the time option 232B shown in FIG. 1E.

The selected style option may be used to instruct the electronic device 100 to perform, based on the style option, style migration on a video collected by the camera. For example, based on that the selected style option, namely, the "Day and night conversion" style option 231A, the electronic device 100 may obtain a daytime style option and a night style option locally or from the cloud. When determining a frame quantity of images included in the time-lapse video, the electronic device 100 may perform interpolation fusion on the daytime style option and the night style option, and perform style migration on the video by using the obtained fused style migration model.

The selected time length may be used to indicate a frame extraction ratio when frame extraction is performed on the video collected by the camera of the electronic device 100.

In some embodiments, when receiving the first user operation, the electronic device 100 may first display an option used to determine the time of a time-lapse video. Afterwards, the electronic device 100 displays an option used to determine a style of the time-lapse video.

Alternatively, when receiving the first user operation, the electronic device 100 may further simultaneously display an option used to determine the style and the time of the time-lapse video. A manner m which the electronic device 100 displays the option used to determine the style and the time of the time-lapse video is not limited in this embodiment of this application.

S204: The electronic device 100 receives a user operation of starting time-lapse photographing and ending time-lapse photographing, to obtain a first video, where the first video includes an image collected by the camera in a process from starting time-lapse photographing to ending time-lapse photographing.

The user operation of starting time-lapse photographing may be, for example, the user operation performed on the "Confirm" control 232C after the time is selected in the time option 232B shown in FIG. 1E. The user operation of ending time-lapse photographing may be, for example, the user operation performed on the shooting stop control 205 shown in FIG. 1F. The foregoing process from starting time-lapse photographing to ending time-lapse photographing is a process of performing time-lapse photographing.

The camera of the electronic device 100 may collect images (for example, 30 frames of images are collected per second) at a rate of collecting images through normal video recording in the time-lapse photographing process. The electronic device 100 may connect, in series in an order of collection time, images collected by the camera in the time-lapse photographing process, to obtain the first video.

S205: The electronic device 100 performs image stabilization processing on the first video, to obtain a second video.

According to the method for performing image stabilization processing on a video in the foregoing embodiment, the electronic device 100 may perform image stabilization processing on the first video, to obtain the second video. The specific method for image stabilization processing is not described herein again.

S206: The electronic device 100 performs frame extraction on the second video based on the time length selected by the user in the second user operation, to obtain a third video, where a time length of the third video is the time length selected by the user.

The electronic device 100 may determine a frame extraction ratio based on a time length of the process in which camera performs time-lapse photographing and the time length selected by the user in the second user operation. The electronic device 100 may perform frame extraction on the second video based on the frame extraction ratio, and connect extracted images in series in an order of collection time, to obtain the third video.

For example, as shown in FIG. 1F, when time-lapse photographing is performed up to one minute, the electronic device 100 receives a user operation performed on the shooting stop control 205, and the electronic device 100 may end shooting. That is, the time-lapse photographing process of the camera lasts one minute. As shown in FIG. 1E, the time length selected by the user in the second user operation is 10 seconds. In this case, the electronic device 100 may determine that the frame extraction ratio is 1:6. The electronic device 10 may extract one frame of image from every six frames of images. In a possible implementation, the electronic device 100 may extract frames at an equal interval. That is, the electronic device 100 may extract the $1^{st}$ frame image, the $7^{th}$ frame image, the $13^{th}$ frame image, and the like in the second video. Then, the electronic device 100 may connect the extracted images in series in an order of collection time, to obtain the third video.

In addition to the foregoing equal-interval frame extraction, the electronic device 100 may further perform frame extraction in another manner according to the obtained frame extraction ratio.

S207: The electronic device 100 performs, by using the fused style migration model, style migration on the third video based on the style selected by the user in the second user operation, and saves the video on which style migration is performed as a time-lapse video.

The electronic device 100 may determine, based on the style selected by the user in the second user operation, a style migration model that needs to be fused. Further, the electronic device 100 may determine, based on a frame quantity of images included in the third video, a fused style migration model for performing style migration on all frames of images in the third video. According to the method for performing style migration on a video by using a fused style migration model in the foregoing embodiment, the electronic device 100 may perform style migration on each frame of image in the third video by using the obtained fused style migration model, to obtain the time-lapse video. The electronic device 100 may save the time-lapse video. A specific implementation method for performing style migration by the electronic device 100 on the third video is not described herein again.

It can be learned from the shooting method shown in FIG. 6 that, when performing time-lapse photographing, the user may select an expected video style and a time length of the time-lapse video. The electronic device may perform frame extraction on the collected video, to compress the time length of the original video to the time length expected by the user. The electronic device performs style migration on the video based on the video style selected by the user, so that a video shot by the user in a short time has a time-lapse effect of long-time video shooting. For example, the time-lapse video shot within one minute may have a time-lapse effect of changing gradually quickly from daytime to night that originally needs to be shot for 12 hours or even longer. In addition, the electronic device may perform image stabilization processing on a shot video. In this way, when shooting a time-lapse video, the user may hold the electronic device to perform shooting, and no fixing device is required to fix the electronic device used for shooting in one place. In the foregoing shooting method, time-lapse photographing breaks through limitations on a shooting scene, a device, and a time, and convenience and interest of performing time-lapse photographing by a user are improved.

In some embodiments, the electronic device 100 does not receive the style that is of the time-lapse video and that is selected by the user. The electronic device 100 may not perform style migration on the video. For example, as shown in FIG. 1C, the user does not select a style from the style option 231. That is, all styles in the style option 231 are in an unselected state. Further, the electronic device 100 receives a user operation used to start time-lapse photographing, and the electronic device 100 may start time-lapse photographing. For the original video collected in the time-lapse photographing process, the electronic device 100 may perform image stabilization processing and frame extraction processing to obtain the time-lapse video. That is, the user may choose to compress only the original video collected by the camera in terms of time, to obtain a time-lapse video with a corresponding time-lapse effect.

In some embodiments, if the electronic device 100 determines that a time length that is of the time-lapse video and that is selected by the user is longer than a time length of a time-lapse photographing process, the electronic device 100 may perform image stabilization processing on the collected original video, and perform, based on a style of a time-lapse video selected by the user, style migration on the video on which the image stabilization processing is performed, to obtain the time-lapse video. In other words, the electronic device 100 may not perform frame extraction processing on a video. Alternatively, if the electronic device 100 determines that a time length that is of the time-lapse video and that is selected by the user is longer than the time length of the time-lapse photographing process, the electronic device 100 may first perform image stabilization processing on the collected original video. Then, the electronic device 100 may perform frame insertion on the video on which the image stabilization processing is performed, to increase a time length of the video to the time length that is of the time-lapse video and that is selected by the user. Finally, the electronic device 100 may perform, based on the style that is of the time-lapse video and that is selected by the user, style migration on the video that has undergone frame insertion processing, to obtain the time-lapse video. For a specific implementation of performing frame insertion on the video, refer to a frame insertion method in the conventional technology. This is not limited in this embodiment of this application.

The following describes another scenario of obtaining a time-lapse video according to an embodiment of this application.

FIG. 7A to FIG. 7G show an example of a scenario of obtaining a time-lapse video. In this scenario, an electronic device 100 may perform processing (for example, frame extraction and style migration) on a video collected in a non-time-lapse photographing mode, to obtain a time-lapse video.

Figure 7A:
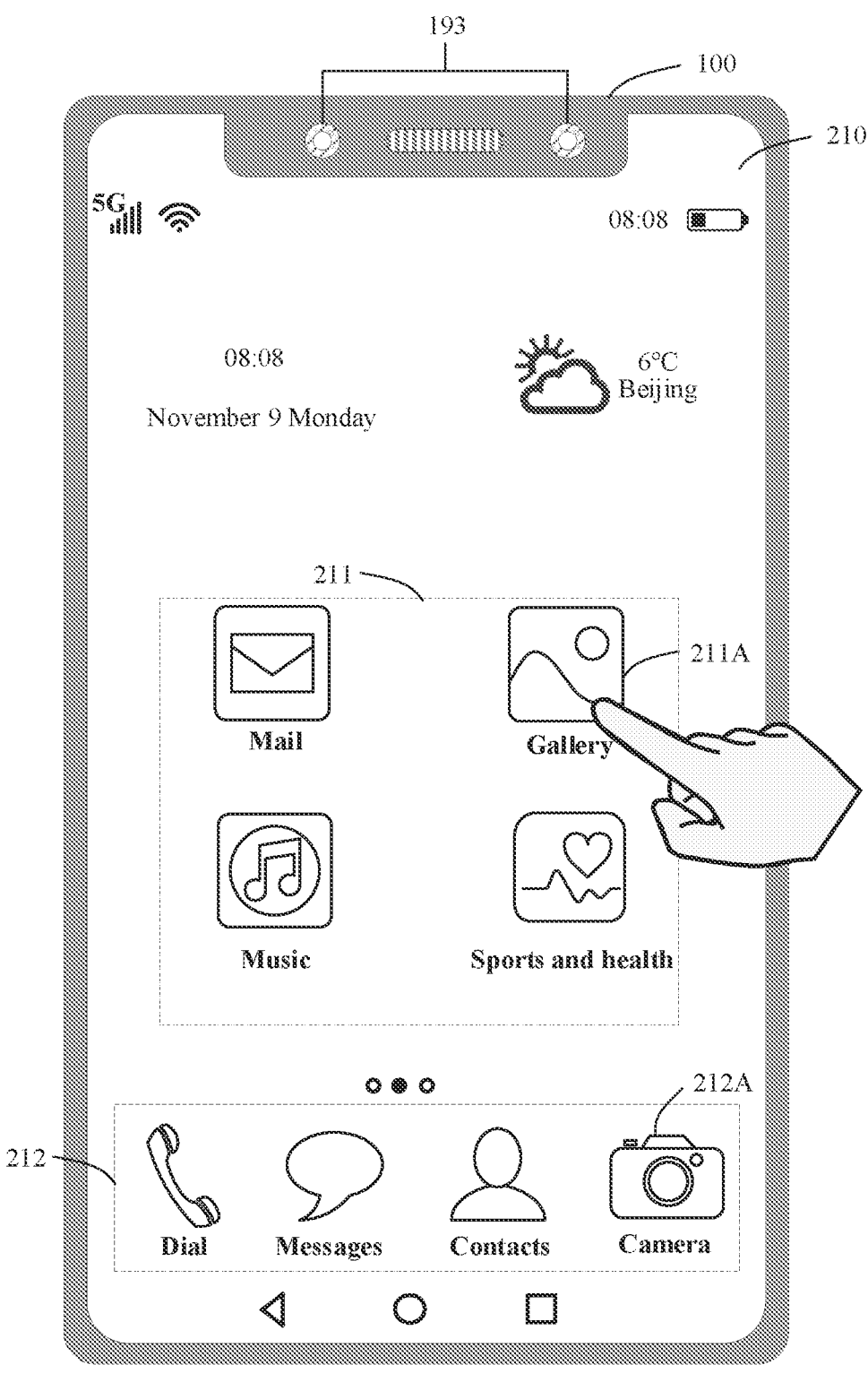
FIG. 7A to FIG. 7G are schematic diagrams of some user interfaces for performing style migration on a video according to an embodiment of this application.
Figure 7B:
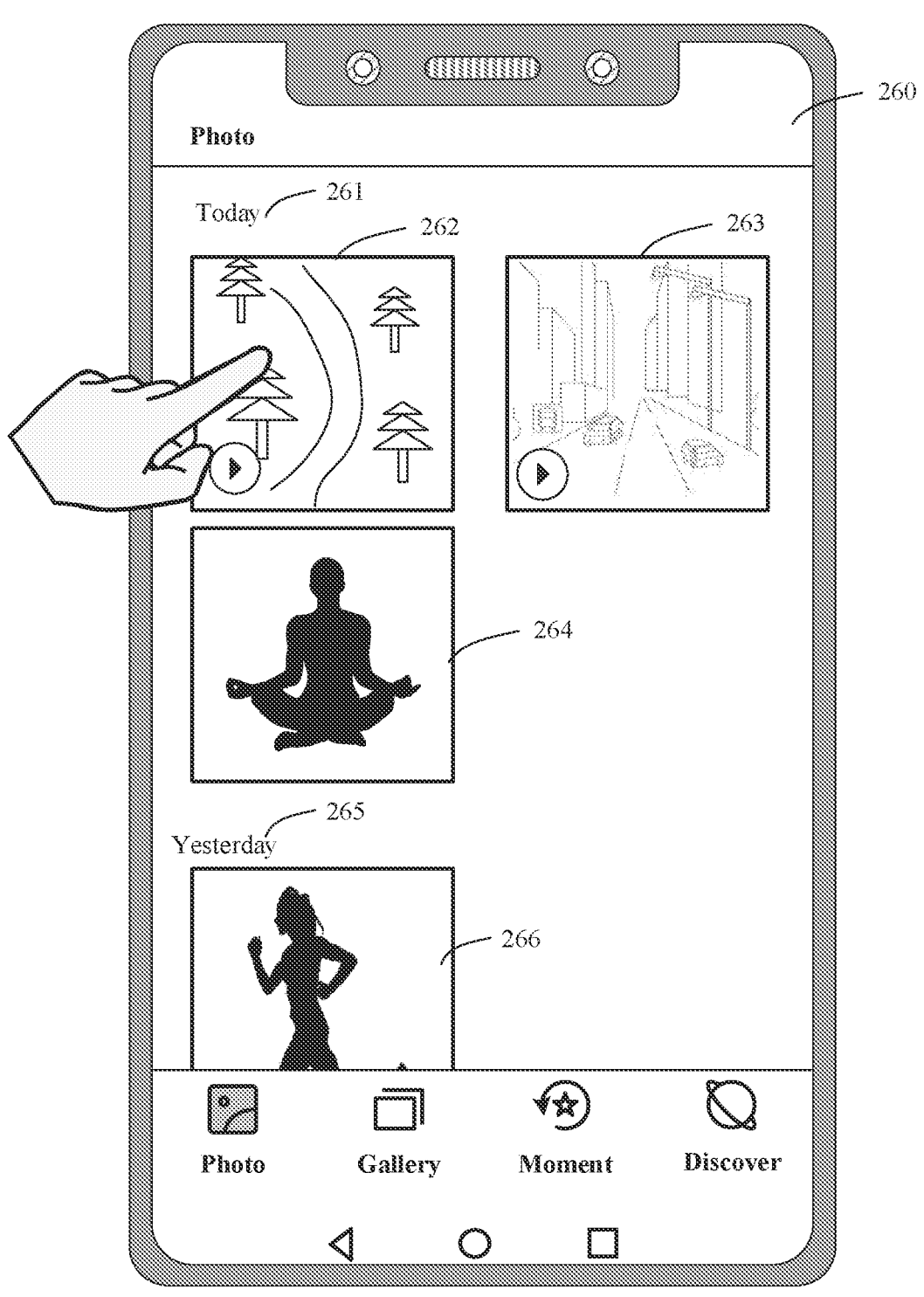

As shown in FIG. 7A, in response to a user operation performed on an icon 211A of Gallery on a user interface 210, the electronic device 100 may start a gallery application, and display a gallery interface 260 shown in FIG. 7B. The gallery interface 260 may include a first time indicator 261, a second time indicator 265, a first video thumbnail 262, a second video thumbnail 263, a first photo thumbnail 264, and a second photo thumbnail 266. Details are as follows:

The first video thumbnail 262 and the second video thumbnail 263 may be covers of the first video and the second video respectively. The electronic device 100 may use a $1^{st}$ frame image of the video as the cover of the video thumbnail. In response to a user operation performed on the first video thumbnail 262 or the second video thumbnail 263, the electronic device 100 may display a user interface used to play the first video or the second video.

The first photo thumbnail 264 and the second photo thumbnail 266 may be thumbnails of the first photo and the second photo respectively. In response to a user operation performed on the first photo thumbnail 264 or the second photo thumbnail 266, the electronic device 100 may display the first photo or the second photo.

The first time indicator 261 and the second time indicator 265 may be used to indicate when the video and photo were shot and taken under the first time indicator 261 and the second time indicator 265, respectively. For example, a time indicated by the first time indicator 261 is today (a current day is a time displayed on the user interface 210, November 9). The first video thumbnail 262, the second video thumbnail 263, and the first photo thumbnail 264 are located under the first time indicator 261. In other words, the first video, the second video, and the first photo are shot and taken by the electronic device 100 on November 9. A time indicated by the second time indicator 265 is yesterday (that is, November 8). The second photo thumbnail 166 is located under the second time indicator 265. In other words, the second photo is taken by the electronic device 100 on November 8.

In response to a user operation of sliding up and down on the gallery interface 260, the electronic device 100 may display more content on the gallery interface 260.

Figure 7C:
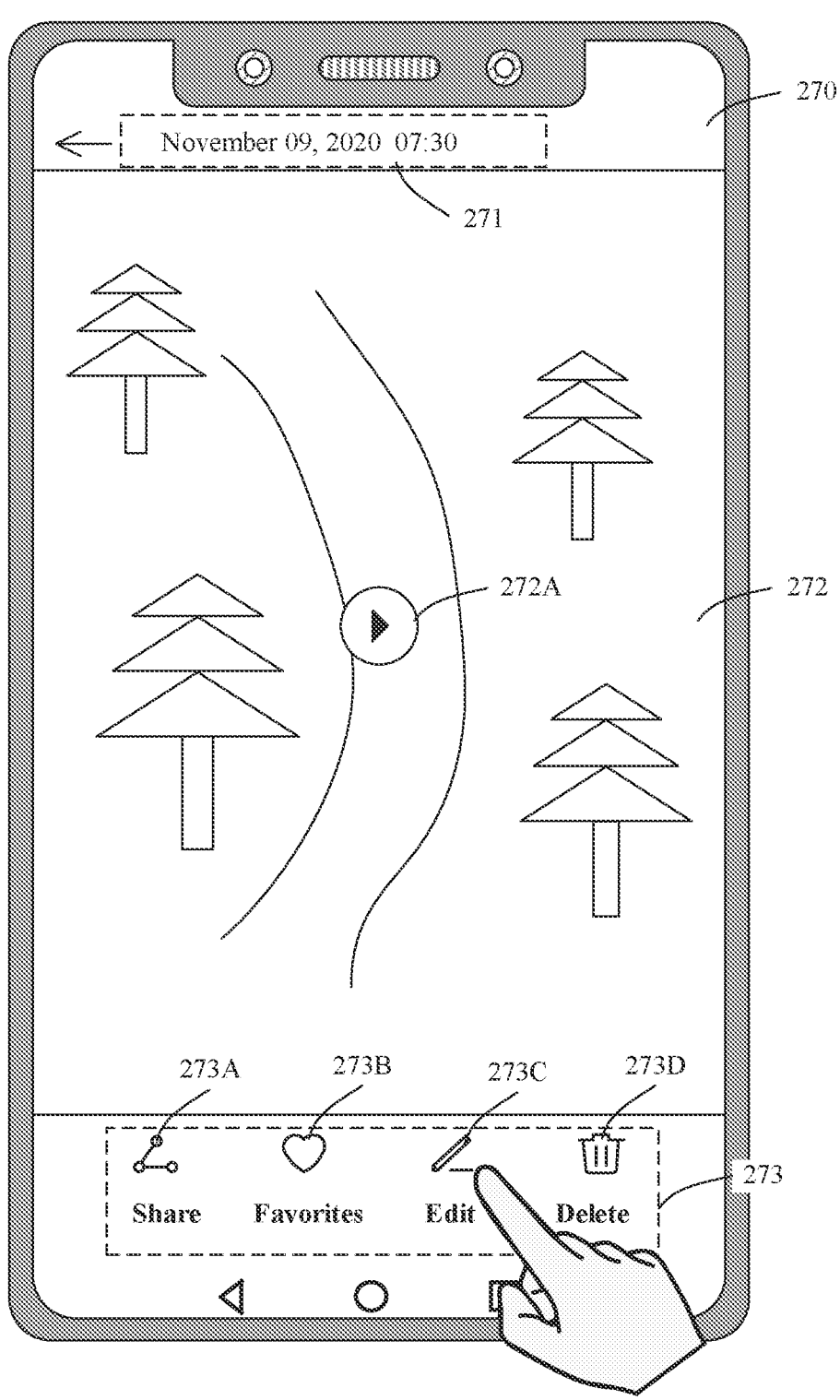

In response to a user operation performed on the first video thumbnail 262, the electronic device 100 may display a user interface 270 shown in FIG. 7C. The user interface 270 may include a time control 271, a video playback area 272, and a setting option 273. Details are as follows:

The time control 271 may be used to indicate a time point at which the electronic device 100 stores the first video, for example, 7:30 on Nov. 9, 2020. The time point for storing the first video may be a time point at which shooting of the first video is completed.

The video playback area 272 may include a playback control 272A. The playback control 272A may be used to indicate the electronic device 272A to play the first video.

The setting option 273 may include a "Share" option 273A, a "Favorites" option 273B, an "Edit" option 273C, and a "Delete" option 273D. The "Share" option 273A may be used by the user to share the first video with another device. The "Favorites" option 273B may be used by the user to add the first video to favorites. The "Edit" option 273C may be used by the user to perform an editing operation on the first video, for example, rotation and cropping, or adding a filter. The "Delete" option 273D may be used by the user to delete the first video from the electronic device 100.

Figure 7D:
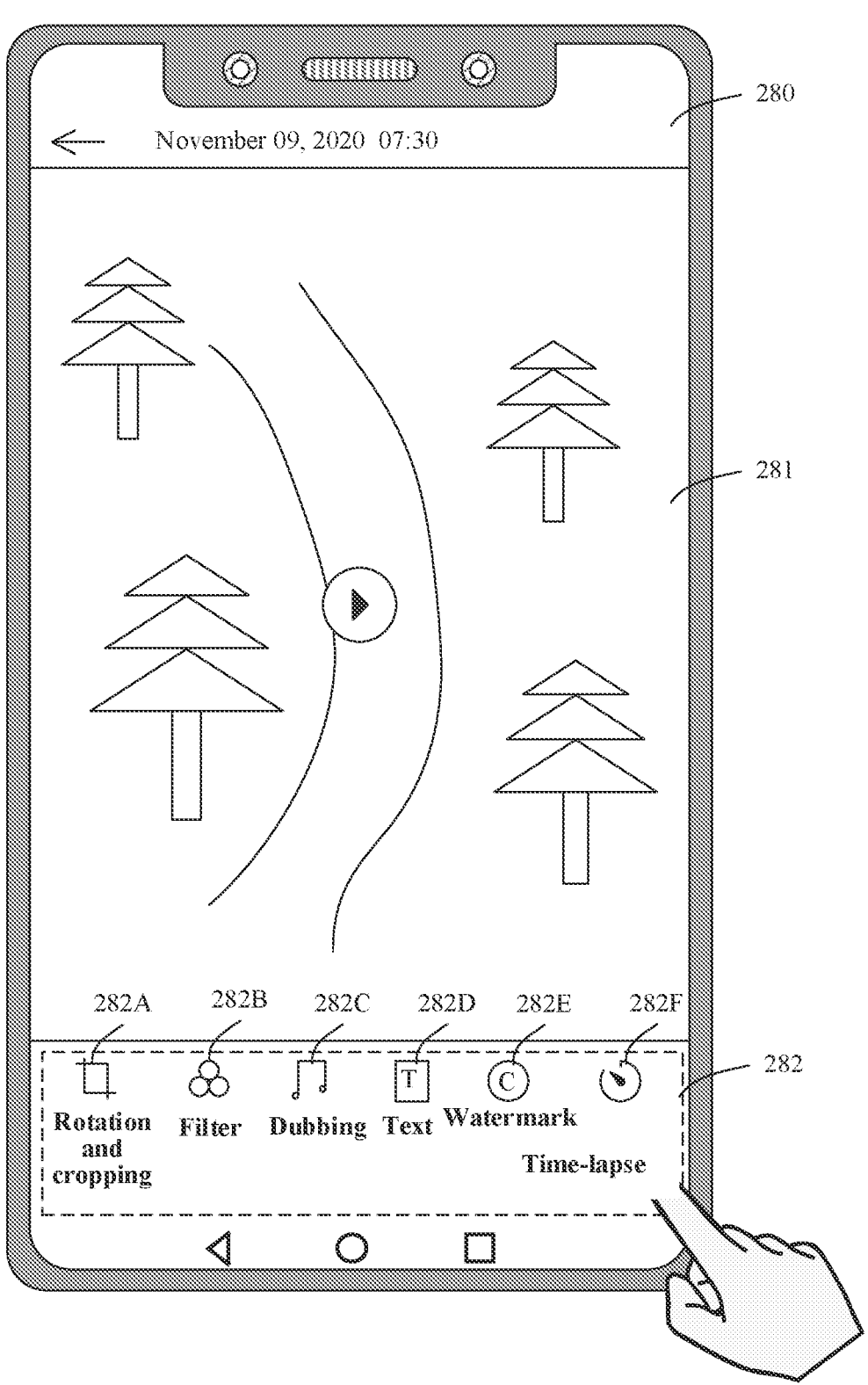

In response to a user operation performed on the "Edit" option 273C, the electronic device 100 may display a video editing interface 280 shown in FIG. 7D. The video editing interface 280 may include a video playback area 281 and an "Edit" option 282. Details are as follows:

For the video playback area 281, refer to the foregoing description of the video playback area 272 in FIG. 7C.

The "Edit" option 282 may include a "Rotation and cropping" option 282A, a "Filter" option 282B, a "Dubbing" option 282C, a "Text" option 282D, a "Watermark" option 282E, and a "Time-lapse" option 282F. The option cropping option 282A may be used to rotate and crop each frame of image in the first video. The "Filter" option 282B, the "Dubbing" option 282C, the "Text" option 282D, and the "Watermark" option 282E may respectively add a filter, background music, a text, and a watermark for each frame of image in the first video. The "Time-lapse" option 282F may be used to perform frame extraction processing and style migration processing on the first video, to obtain a video with a time-lapse effect.

The "Edit" option 282 may include more or fewer options.

Figure 7E:
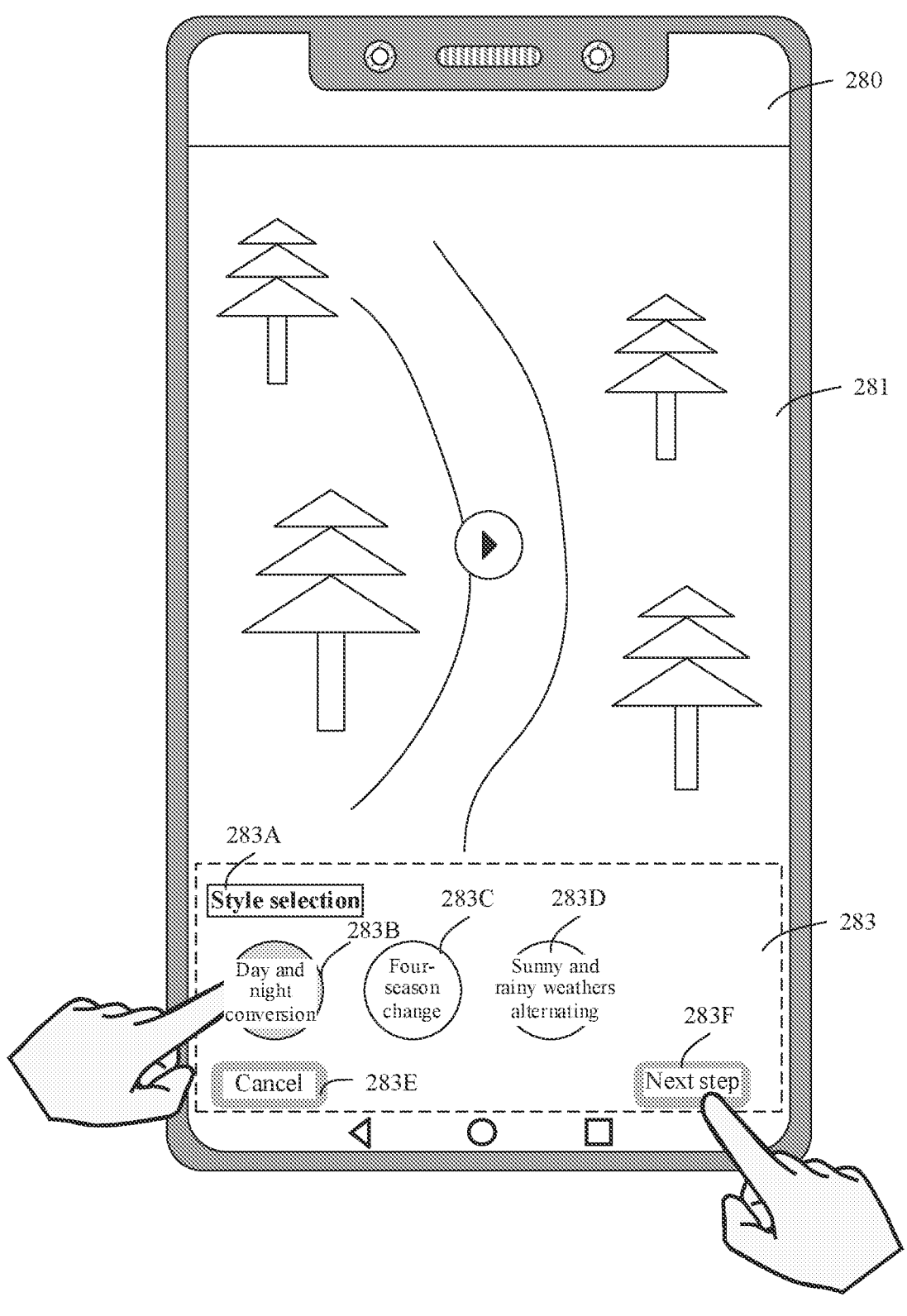

For example, in response to a user operation performed on the "Time-lapse" option 282F, the electronic device 100 may display a video editing interface 280 shown in FIG. 7E. The video editing interface 280 may further include a style selection option 283. The style selection option 283 may include a prompt control 283A, a "Day and night conversion" style option 283B, a "Four-season change" style option 283C, a "Sunny and rainy weathers alternating" style option 283D, a "Cancel" control 283E, and a "Next step" control 283F. Details are as follows:

The prompt control 283A may be used to prompt the user to select a style for performing style migration processing on the first video. The prompt control 283A may include a text prompt "style selection". A specific form of the prompt control 283A is not limited in this embodiment of this application.

For functions of the "Day and night conversion" style option 283B, the "Four-season change" style option 283C, and the "Sunny and rainy weathers alternating" style option 283D, refer to descriptions of the "Day and night conversion" style option 231A, the "Four-season change" style option 231B, and the "Sunny and rainy weathers alternating" style option 231C in FIG. 1C in the foregoing embodiment. Details are not described herein again.

The cancel control 283E may be used by the user to cancel the style selection. In response to a user operation performed on the cancel control 283E, the electronic device 100 may display a video editing interface 280 shown in FIG. 7D.

The "Next step" control 283 may be used by the user to further complete related settings of time-lapse photographing editing. For example, a time length of a time-lapse video is set.

The style selection option 283 may further include more or fewer style options.

Figure 7F:
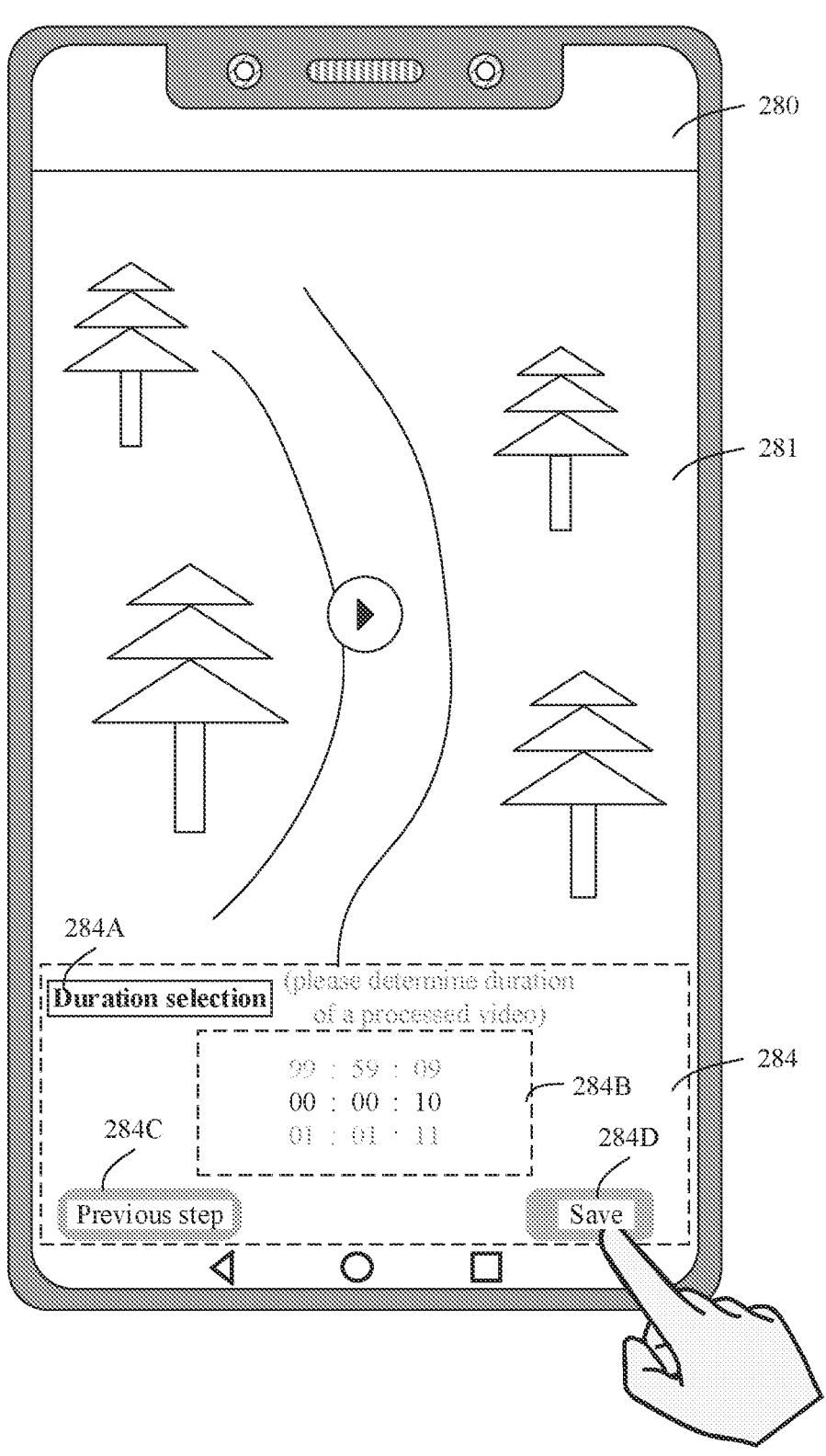

As shown in FIG. 7E, when receiving a user operation performed on a "Day and night conversion" style option 283B and a user operation performed on the next step control 283, the electronic device 100 may display a video editing interface 280 shown in FIG. 7F. The video editing interface 280 may further include a duration selection option 284. The duration selection option 284 may include a prompt control 284A, a time option 284B, a "Previous step" control 284C, and a "Save" control 284D. Details are as follows:

The prompt control 284A may be used to prompt the user to select a time length of a finally generated time-lapse video. The prompt control 284A may include a text prompt "duration selection (please determine duration of a processed video)".

For a function of the time option 284B, refer to the description of the time option 232B in FIG. 1E in the foregoing embodiment. Details are not described herein again.

The control 284C in the previous step may be used by the user to return to a previous step, and reselect a style for performing style migration processing on the first video. In response to a user operation performed on the "Previous step" control 284C, the electronic device 100 may display the video editing interface 280 shown in FIG. 7D.

The "Save" control 284D may be used by the electronic device 100 to store a style (for example, a day and night conversion style) and a time length (for example, 10 seconds) that are selected by the user. In response to the user operation performed on the "Save" control 284D, the electronic device 100 may perform frame extraction and style migration on the first video based on the style and the time length that are selected by the user, to obtain the time-lapse video. A time length of the time-lapse video is the time length selected by the user. The electronic device 100 may perform, by using a fused style migration model (for example, a fused style migration model in which a daytime style migration model and a night style migration model are fused), style migration on the first video on which frame extraction processing is performed. For a specific implementation of performing style migration on the video by using the fused style migration model, refer to descriptions in the foregoing embodiments. Details are not described herein again.

When the time-lapse video is obtained, the electronic device 100 may display a user interface 270 shown in FIG.

Figure 7G:
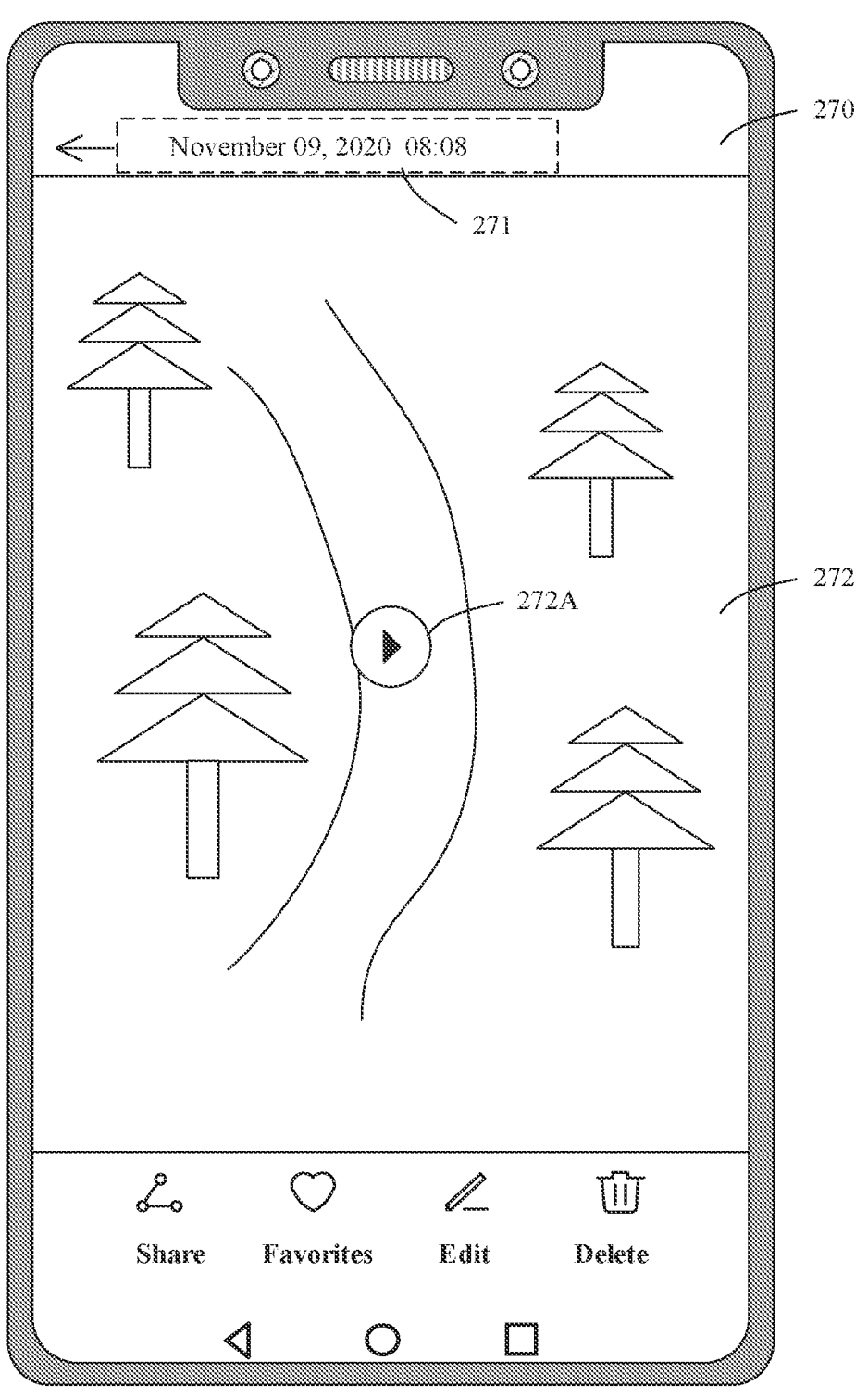

7G. Content included in the user interface 270 shown in FIG. 7G is consistent with controls included in the user interface 270 shown in FIG. 7C. A difference lies in that a video included in a video playback area 272 is a cover of the time-lapse video obtained after frame extraction and style migration are performed on the first video. The cover of the time-lapse video may be a 1$^{st}$ frame image of the time-lapse video.

In addition, the time control 271 may indicate a time point at which the electronic device 100 stores the time-lapse video, for example, at 8:08 a.m. on Nov. 9, 2020. It can be learned that a time point at which the electronic device 100 stores the first video is different from a time point at which the electronic device 100 stores the time-lapse video. The first video is shot at 7:30 a.m. on Nov. 9, 2020 and stored in the electronic device 100. The time-lapse video is obtained by the electronic device 100 by processing the first video at 8:08 a.m. on Nov. 9, 2020 and stored in the electronic device 100.

In response to a user operation performed on the playback control 272A shown in FIG. 7G, the electronic device 100 may play the time-lapse video. For the process of playing the time-lapse video, refer to the video playing process shown in FIG. 2A to FIG. 2C. Details are not described herein again.

It can be seen from the foregoing embodiment that, the user may select a style and a time length to perform time-lapse processing on a shot video. The shot video may be, for example, a video collected by the electronic device 100 by using the camera when the "Video" mode option 201B in the camera mode options shown in FIG. 1B is selected. In other words, the electronic device 100 may perform frame extraction and style migration processing on any video, to obtain the time-lapse video. A time-lapse effect of the time-lapse video may not be affected by a time length of an original video. After frame extraction and style migration processing in this embodiment of this application are performed on any video shot by the user in a short time, a time-lapse effect of long-time video shooting may be achieved.

The following describes a scenario in which a panorama with a style gradually changing effect is shot according to an embodiment of this application.

FIG. 8A to FIG. 8E show examples of schematic diagrams of a scenario in which an electronic device 100 shoots a panorama with a style migration effect.

Figure 8A:
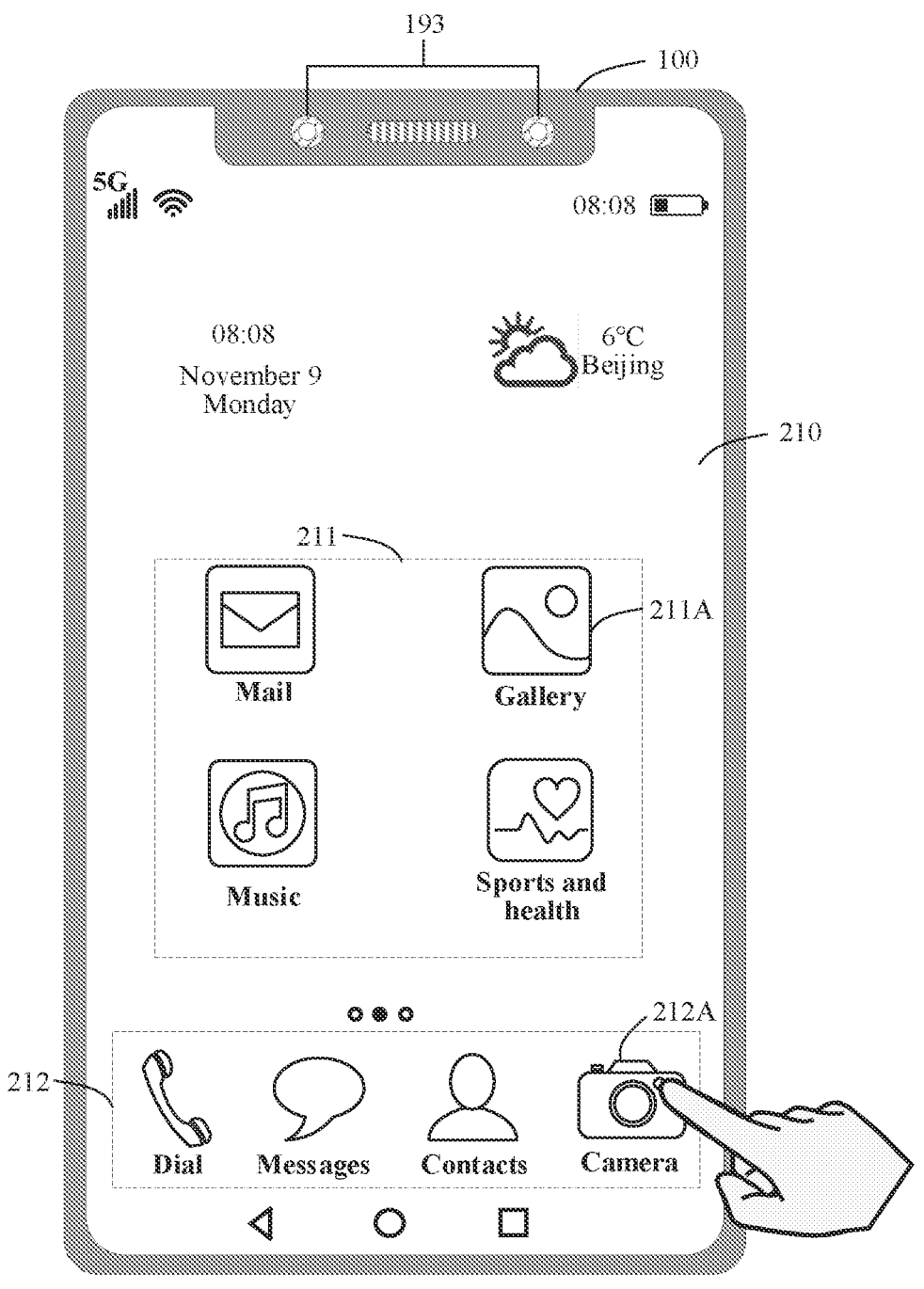
FIG. 8A to FIG. 8E are schematic diagrams of some user interfaces for shooting a panorama according to an embodiment of this application.

As shown in FIG. 8A, in response to a user operation performed on an icon 212A of Camera on a user interface 210, the electronic device 100 may start a camera application and a camera. The electronic device 100 may display a user interface 290 shown in FIG. 8B.

Figure 8B:
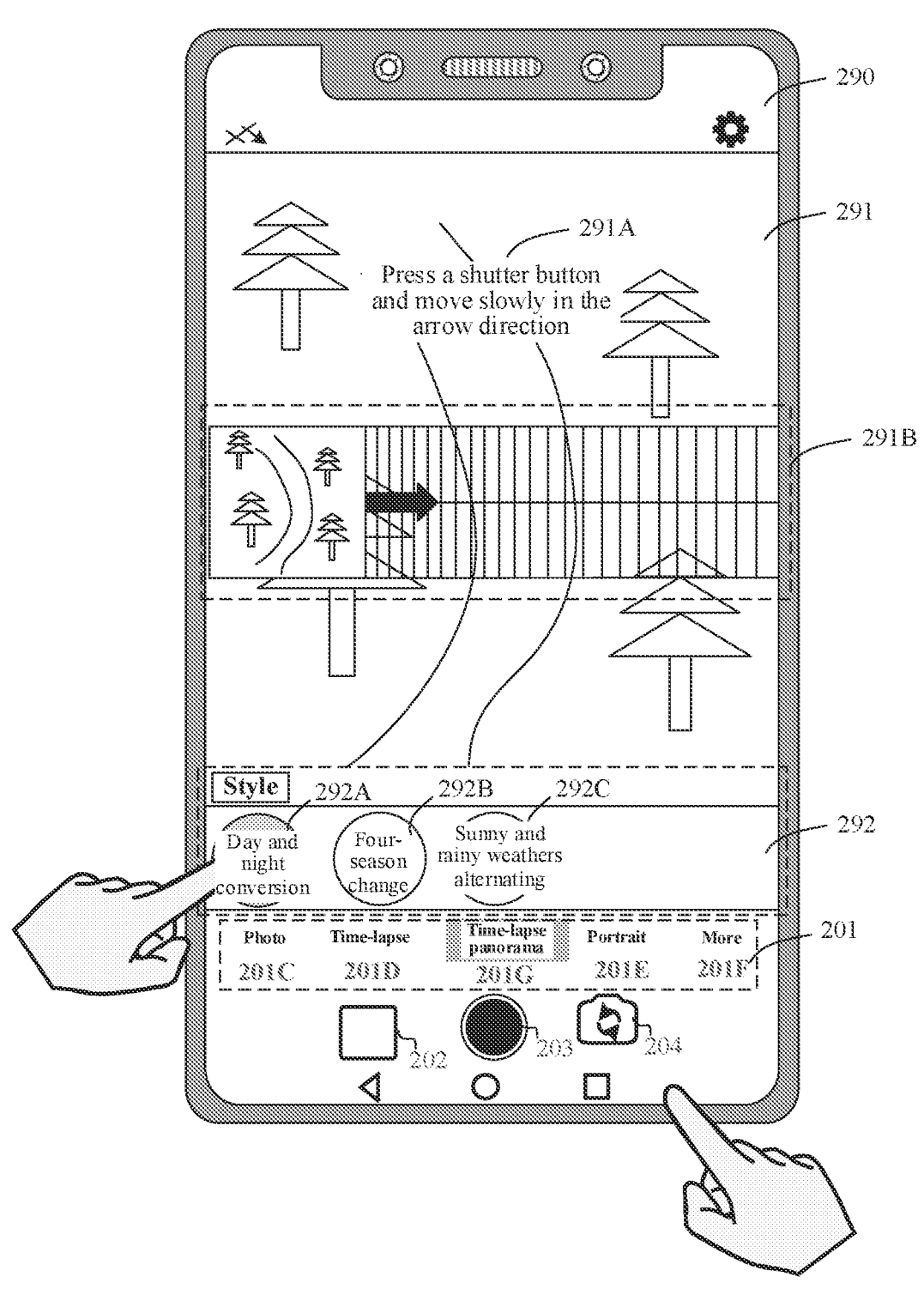

As shown in FIG. 8B, the user interface 290 may include a preview area 291, a style option 292, a camera mode option 201, a gallery shortcut control 202, a shutter control 203, and a camera flipping control 204. Details are as follows:

For descriptions of the camera mode option 201, the gallery shortcut control 202, the shutter control 203, and the camera flipping control 204, respectively refer to the descriptions of the camera mode option 201, the gallery shortcut control 202, the shutter control 203, and the camera flipping control 204 shown in FIG. 1B in the foregoing embodiment. In FIG. 8B, the camera mode option 201 may further include a "Time-lapse panorama" mode option 201G, and the "Time-lapse panorama" mode option 201G is in a selected state. In the time-lapse panorama mode, the electronic device 100 may shoot a panorama with a style gradually changing effect.

The style option 292 may include one or more style options. For example, a "Day and night conversion" style option 292A, a "Four-season change" style option 292B, and a "Sunny and rainy weathers alternating" style option 292C. The style option may be used to indicate the electronic device 100 to perform style migration on the shot panorama, to convert a style of the panorama to a style corresponding to the style option.

For example, a style migration model corresponding to the "Day and night conversion" style option 292A may be a fused style migration model obtained by combining a day-time style migration model and a night style migration model. The electronic device 100 may segment the shot panorama into m areas from left to right. There may be an overlapping part in the m areas. Further, the electronic device 100 may perform, by using the foregoing fused style migration model, style migration on the m areas obtained through segmenting from the panorama. The electronic device 100 may select one splicing area from each of the m areas on which style migration is performed, and splice the m areas to obtain a panorama on which style migration is performed. A style of the panorama obtained through splicing from a left side to a right side may be gradually changing from a daytime style to a night style. The style migration model corresponding to the "Four-season change conversion" style option 231B may be a fused style migration model obtained by using a spring style migration model, a summer style migration model, an autumn style migration model, and a winter style migration model. The electronic device 100 may perform, by using the fused style migration model, style migration on the m areas obtained through segmenting from the panorama. The electronic device 100 may select one splicing area from each of the m areas on which style migration is performed, and splice the m areas to obtain a panorama on which style migration is performed. A style of the panorama obtained through splicing from a left side to a right side may be gradually changing from the spring style to the summer style, then from the summer style to the autumn style, and then from the autumn style to the winter style. A style migration model corresponding to the foregoing "Sunny and rainy weathers alternating" style option 231C may be a fused style migration model obtained by fusing a sunny style migration model and a rainy style migration model. The electronic device 100 may perform, by using the fused style migration model, style migration on the m areas obtained through segmenting from the panorama. The electronic device 100 may select one splicing area from each of the m areas on which style migration is performed, and splice the m areas to obtain a panorama on which style migration is performed. A style of the panorama obtained through splicing from a left side to a right side may be gradually changing from a sunny day style to a rainy day style.

The style option 292 may further include more or fewer style options. This is not limited to the fused style migration style model shown in FIG. 8B. The style option 292 may also include a single-style migration model (for example, a cartoon style migration model).

In this embodiment of this application, a specific manner of changing the style of the panorama obtained by perform-ing style migration by using the fused style migration model is not limited. For example, when a received style selected by the user is the day and night conversion style, the electronic device 100 may also perform style migration processing on the plurality of frames of images obtained by segmenting a panorama, and then splice the plurality of frames of images into a panorama. A style of the panorama obtained through splicing from a left side to a right side may be gradually changing from a night style to a daytime style.

Optionally, the electronic device 100 may further segment the panorama from an upper side to a lower side. A style of the panorama obtained from the top to the bottom after the foregoing style migration processing and splicing may be gradually changing from a daytime style to a night style, or gradually changing from a night style to a daytime style. In addition to the segmenting manner shown in the foregoing embodiment, the electronic device 100 may further segment the panorama along any direction of the panorama.

The preview area 291 may be used to display an image collected by the camera in real time. The preview area 291 may include an operation prompt 291A and a shooting progress indication 291B. Details are as follows.

The operation prompt 291A may be used to prompt the user of an operation description of shooting the panorama. The operation prompt 291A may include a text prompt "Press a shutter button and move slowly in an arrow direction". In the foregoing text prompt, the "shutter button" is the shutter control 203. The "arrow" in the text prompt is an arrow in the shooting progress indication 291B.

The shooting progress indication 291B may include a panorama thumbnail and an arrow. The foregoing panorama thumbnail may be used to present a thumbnail of the panorama obtained from a time point at which panorama shooting starts to a current moment. The arrow may be used to indicate a movement direction of the electronic device 100 in the panorama shooting process. For example, the direction in which the arrow points to horizontal right may indicate that in the panorama shooting process, the electronic device 100 moves in a horizontal right direction from a position at a moment at which the panorama shooting starts.

Figure 8C:
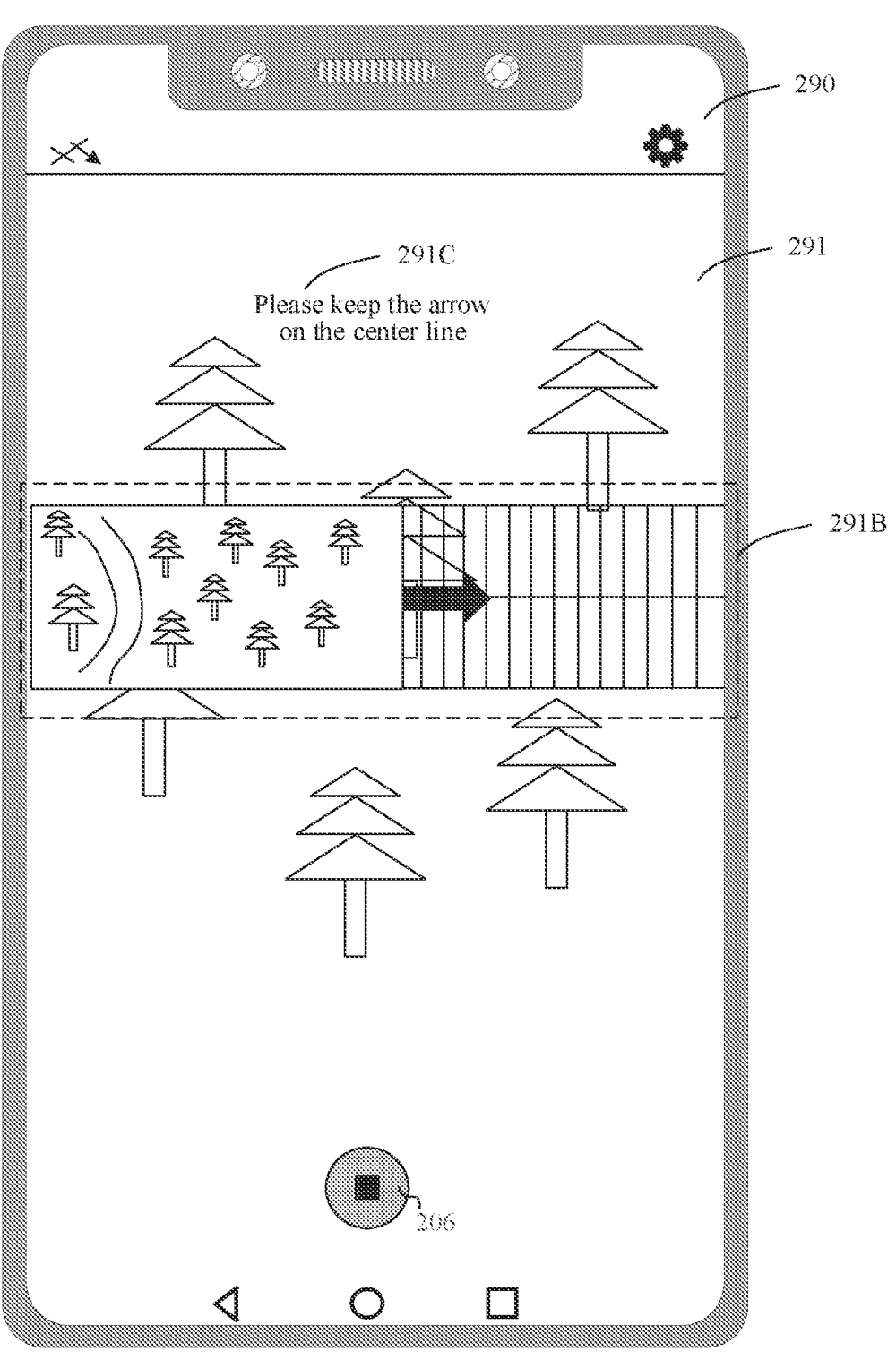

As shown in FIG. 8B, the electronic device 100 receives a user operation performed on the "Day and night conversion" style option 292A and a user operation performed on the shutter control 203. The electronic device 100 may start to perform panorama shooting. For example, the electronic device 100 may display a user interface 290 shown in FIG. 8C. The user interface 290 may include a preview area 291 and a shooting pause control 206. The preview area may be used to display an image collected by the camera in real time. In FIG. 8C, the preview area 291 may include a shooting progress indication 291B and an operation prompt 291C. For the shooting progress indication 291B, refer to the description in the foregoing embodiment. The operation indication 291C may be used to prompt the user to perform shooting in a panorama shooting process. The operation prompt 291C may include a text prompt "Please keep the arrow on the center line".

The shooting pause control 206 may be used to end panorama shooting. In response to a user operation performed on the shooting pause control 206, the electronic device 100 may splice, into a panorama, an image captured by the camera in a process from starting panorama shooting to ending panorama shooting.

In some embodiments, the arrow in the shooting progress indication 291B may move as the electronic device 100 moves. When the arrow moves from an initial location to an end location, the electronic device 100 may end panorama shooting. The end location of the arrow may be, for example, a rightmost position in the shooting progress indication 291B. When ending panorama shooting, the electronic device 100 may splice, into the panorama, the image captured by the camera in the process from starting panorama shooting to ending panorama shooting.

In some embodiments, the electronic device 100 may perform image stabilization processing on a plurality of frames of images collected in the foregoing panorama shooting process. Further, the electronic device 100 may splice the plurality of frames of images on which image stabilization processing is performed into the panorama.

In this embodiment of this application, a manner in which the electronic device 100 splices the images collected by the camera to obtain the panorama is not limited. For a specific implementation, refer to a method for shooting a panorama in the conventional technology.

When an original panorama is obtained, the electronic device 100 may perform style migration on the original panorama based on a style selected by the user, to obtain a panorama with a style gradually changing effect. The electronic device 100 may store the panorama with the style gradually changing effect.

Figure 8D:
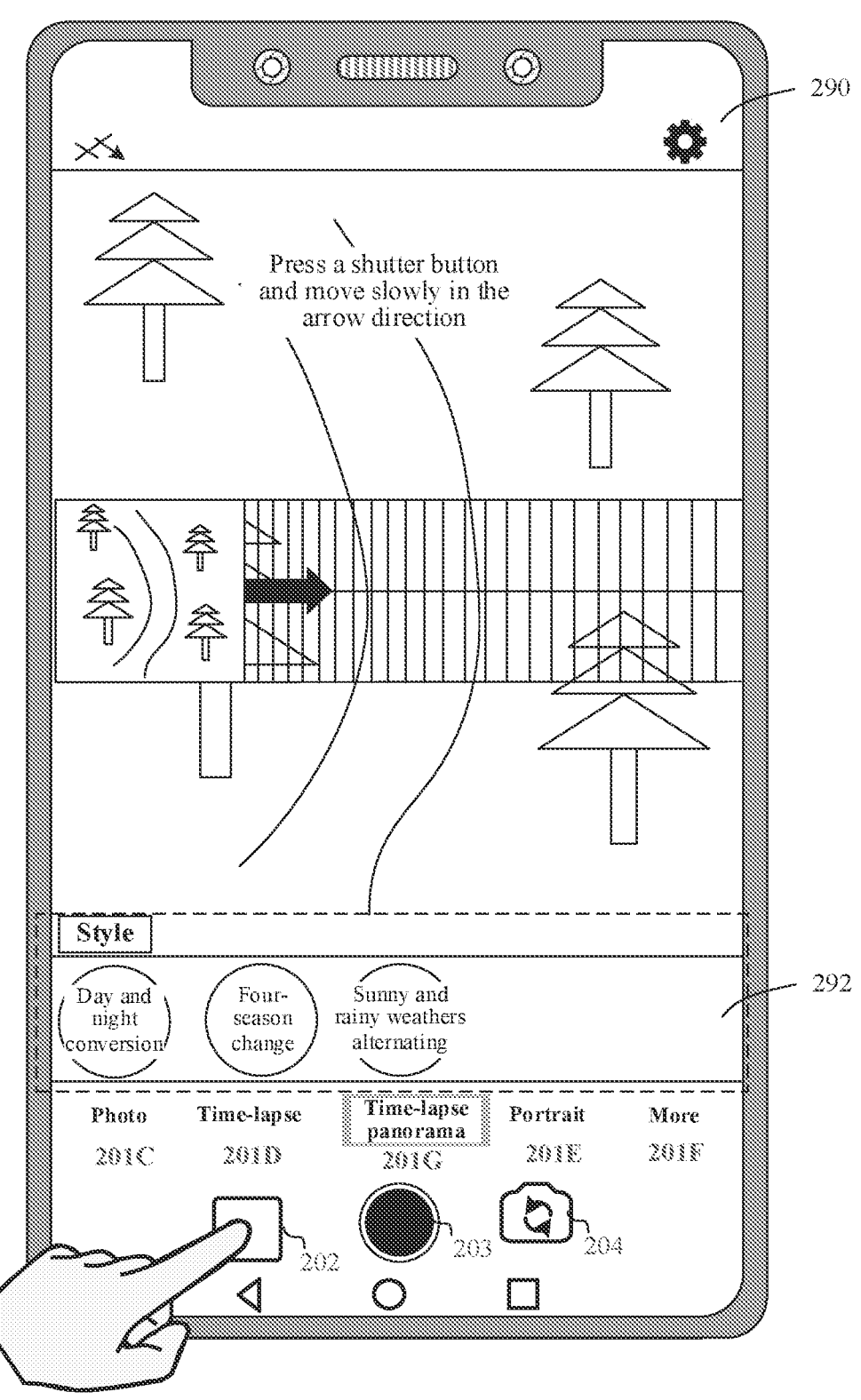

As shown in FIG. 8D, when ending panorama shooting, the electronic device 100 may display a user interface 290. For content included in the user interface 290, refer to the description of the user interface 290 shown in FIG. 8B in the foregoing embodiment. The user may view, by using a gallery shortcut button 202, the shot panorama with the style gradually changing effect.

Figure 8E:
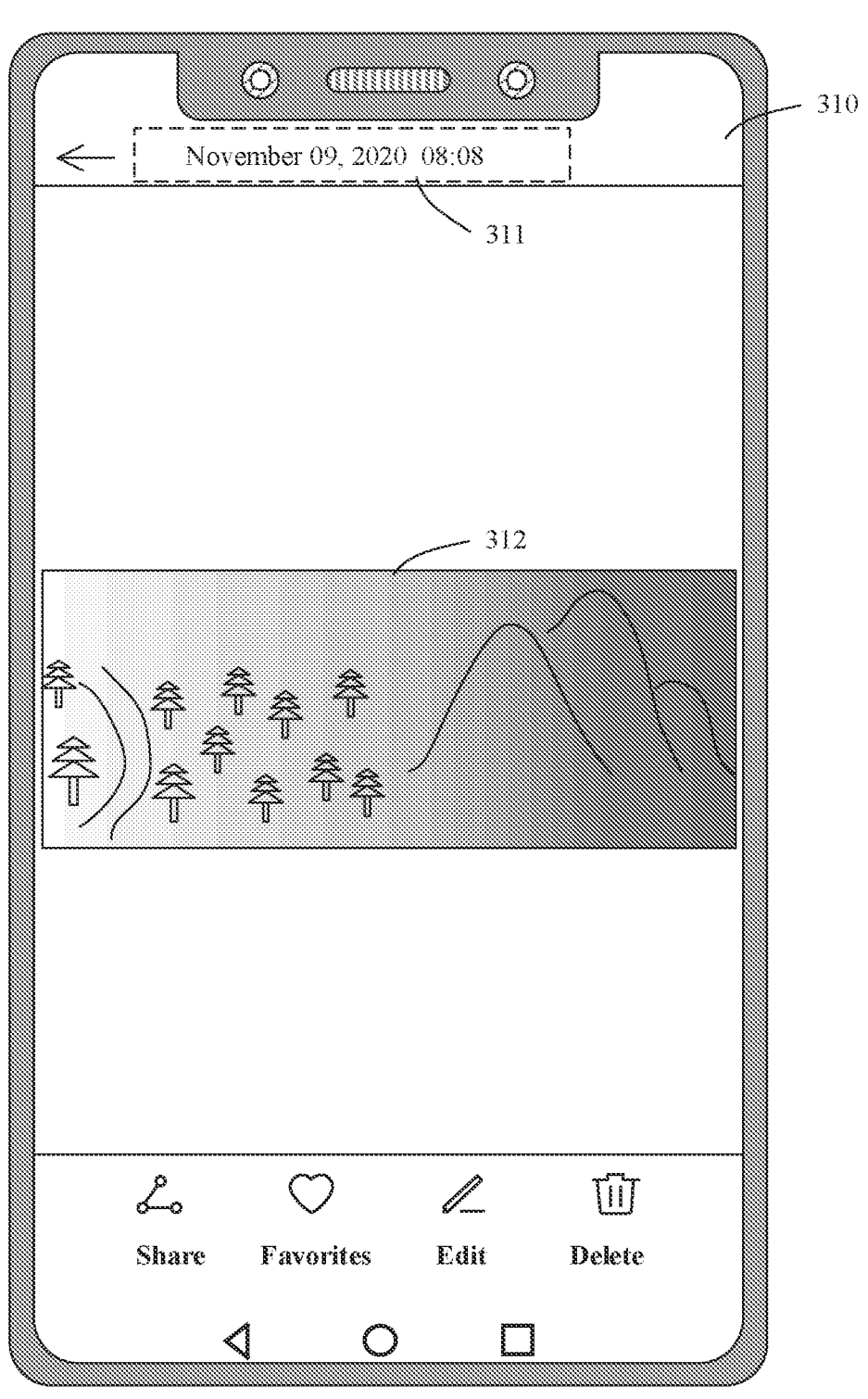

Specifically, in response to a user operation performed on the gallery shortcut button 202, the electronic device 100 may display a user interface 310 shown in FIG. 8E. The user interface 310 may include a time control 311 and a first panorama 312.

The first panorama 312 is a panorama obtained after the panorama shooting processes shown in FIG. 8B and FIG. 8C are performed. A style of the first panorama 312 from left to right may be gradually changing from a daytime style to a night style.

The time control 311 may be used to indicate a time point at which the electronic device 100 stores a first panorama 312.

The user interface 310 may further include more content. This is not limited in this embodiment of this application.

It can be learned from the foregoing embodiment that the electronic device 100 may perform style migration on the panorama by using a fused style migration model, to obtain a panorama with a style gradually changing effect. The foregoing method for processing a panorama improves interest of shooting a panorama by a user.

The following specifically describes an implementation method for performing style migration on a panorama according to an embodiment of this application.

Figure 9A:
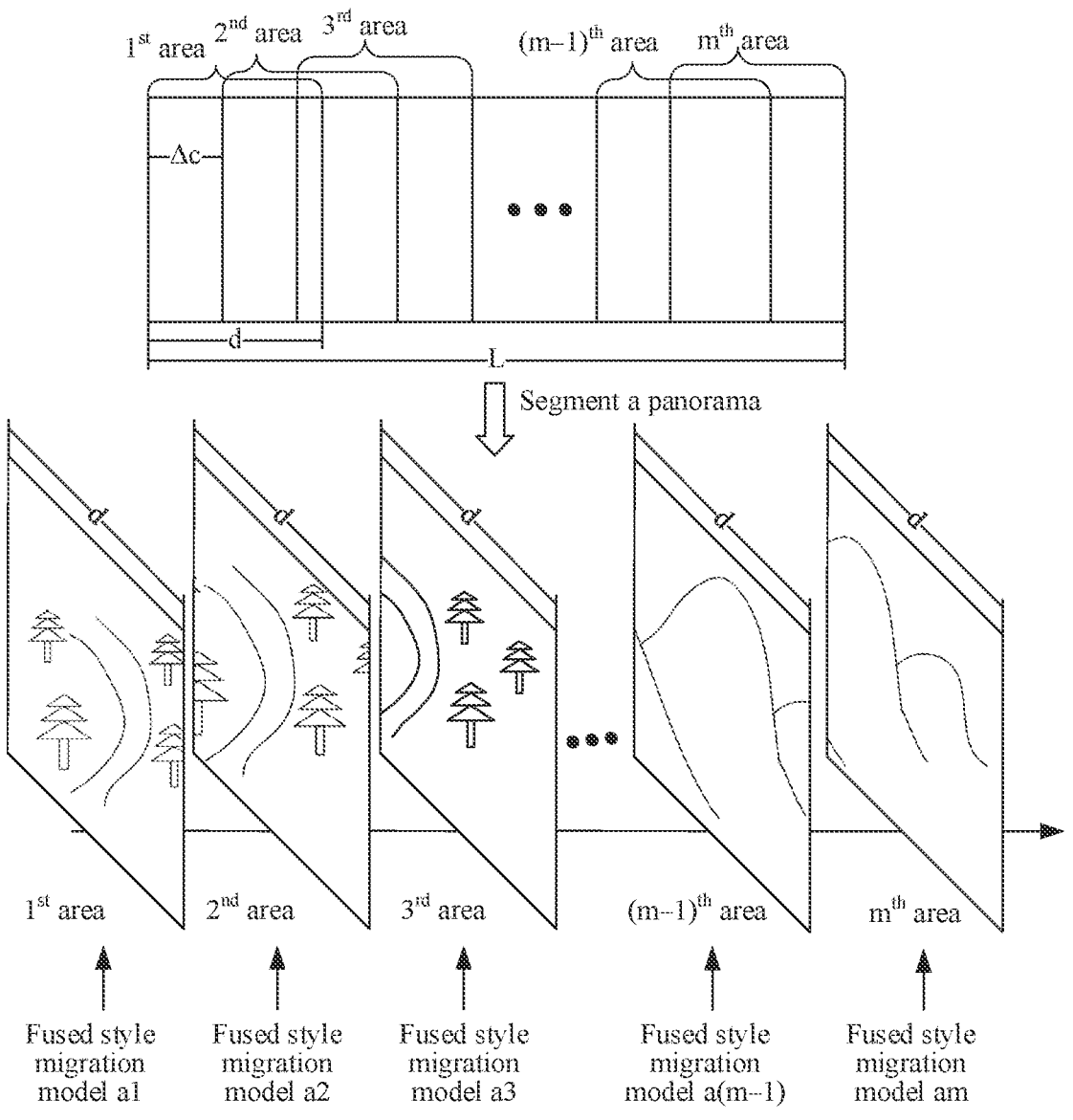
FIG. 9A and FIG. 9B are a schematic diagram of a method for performing style migration on a panorama by an electronic device by using a fusion style change model according to an embodiment of this application.
Figure 9B:
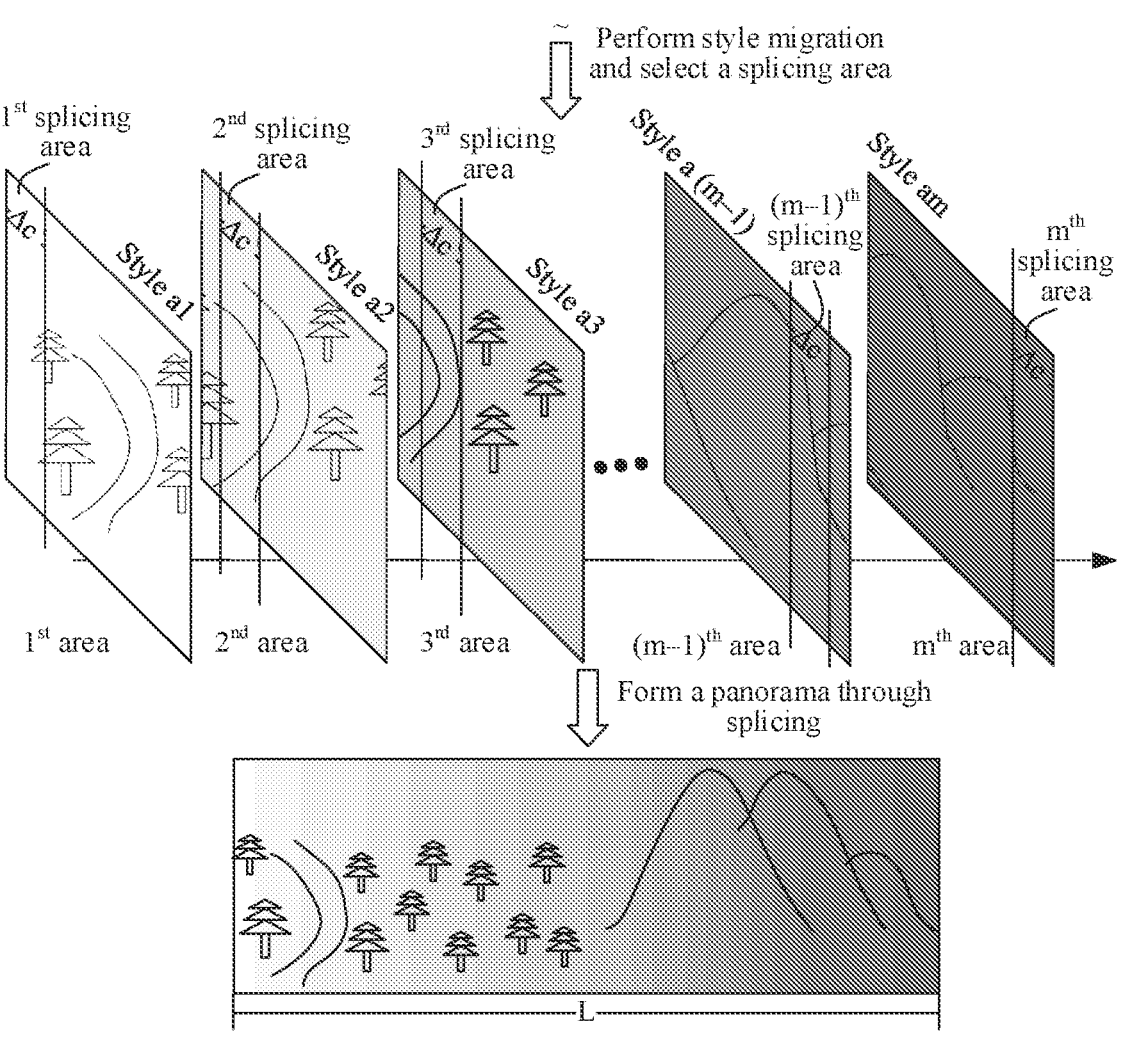

FIG. 9A and FIG. 9B show an example of an implementation method for performing style migration on a panorama. Main steps of performing style migration on a panorama to obtain a panorama with a style gradually changing effect may include; segmenting the panorama, performing style migration on a plurality of areas obtained through segmenting and selecting a splicing area, and splicing the splicing area to obtain the panorama with the style gradually changing effect.

1: Segment the Panorama

As shown in FIG. 9A and FIG. 9B, a length of a first panorama is L. The first panorama may be an original panorama obtained by splicing images taken by the camera in a panorama shooting process shown in FIG. 8B to FIG. 8C. The electronic device 100 may segment the first panorama into m areas from left to right.

In a possible implementation, the electronic device 100 may segment the first panorama in a manner of capturing an image by using a sliding window. Specifically, a length of the sliding window may be d. A distance of each sliding of the sliding window is $\Delta c$. The electronic device 100 slides the sliding window from a leftmost side of the first panorama to right for m−1 times, to obtain m areas of which lengths are all d, where $\Delta c$ is less than d. That is, adjacent areas have an overlapping part. In addition, the following relationship is stored between the length L of the first panorama, $\Delta c$, and d: $d+(m-1)*\Delta c=L$.

2: Perform Style Migration on the Plurality of Areas Obtained Through Segmenting and Selecting the Splicing Area When the foregoing m areas are obtained, the electronic device 100 may separately perform style migration on the m areas based on a style selected by the user. For the foregoing method for performing style migration, refer to descriptions of performing style migration on the plurality of frames of images in the video by the electronic device 100 by using the fused style migration model in the foregoing embodiment.

For example, the style selected by the user is a day and night conversion style. The electronic device 100 may perform interpolation fusion on a daytime style migration model and a night style migration model. A network structure of the fused style migration model is the same as those of the daytime style migration model and the night style migration model. A model used by the electronic device 100 to perform style migration on a $j^{th}$ area is a fused style migration model a j. A parameter of the fused style migration model a j at a first location may be $((m-j+1)/m)\theta_{day}+((j-1)/m)\theta_{night}$. The foregoing $\theta_{day}$ and $\theta_{night}$ are parameters of the daytime style migration model and the night style migration model at the first location respectively. The first location is any location in the network structure of the fused style migration model a j. The first location of the day style migration model, the first location of the night style migration model, and the first location of the fused style migration model a j are all a same location in a same network structure. j is an integer greater than or equal to 1 and less than or equal to m.

The electronic device 100 may separately perform style migration on a $1^{st}$ area to an $m^{th}$ area by using a fused style migration model a1 to a fused style migration model am. Styles corresponding to the fused style migration model 1 to the fused style migration model m are respectively a style 1 to a style m. It can be learned from a calculation formula of the fused style migration model a j that the fused style migration model 1 may be a daytime style migration model. The style 1 may be a daytime style. The fused style migration model m may be a night style migration model. The style m may be a night style.

It can be learned from FIG. 9A and FIG. 9B that styles of the $1^{st}$ area to the $m^{th}$ area are respectively the style 1 to the style m. The styles of the $1^{st}$ area to the $m^{th}$ area gradually change from the daytime style to the night style.

Further, the electronic device 100 may capture a part of the splicing area from each of the $1^{st}$ area to the $m^{th}$ area on which style migration is performed. The electronic device 100 may splice the splicing areas obtained through capturing. In this way, the electronic device 100 may obtain a panorama with a style gradually changing effect.

In a possible implementation, the electronic device 100 may capture a splicing area of a same length from each area. The length of the stitched area may be $\Delta c'$, where $\Delta C'=L/m$. To ensure that the splice areas have no overlapping part, when capturing a $k^{th}$ splicing area from the $k^{th}$ area, the electronic device 100 may capture a splicing area of which a length is $\Delta c'$ starting at a leftmost length of $(k-1)*(\Delta c'-\Delta c)$ from the $k^{th}$ area, where k is an integer greater than or equal to 1 and less than or equal to m.

For example, the electronic device 100 captures, starting from a leftmost side of the $1^{st}$ area on which style migration is performed, a splicing area of which a length is $\Delta c'$, to obtain a $1^{st}$ splicing area. The electronic device 100 captures, starting from a location that is on a leftmost side of the $2^{nd}$ area and of which a length is $\Delta c'-\Delta c$, a splicing area of which a length is $\Delta c'$, to obtain a $2^{nd}$ splicing area. By analogy, the electronic device 100 captures, starting from a location that is on a leftmost side of the $m^{th}$ area and of which a length is $(m-1)*(\Delta c'-\Delta c)$, a splicing area of which a length is $\Delta c'$, to obtain an $m^{th}$ splicing area.

3. Splicing the Splicing Area to Obtain the Panorama with the Style Gradually Changing Effect The electronic device 100 may splice the $1^{st}$ splicing area to the $m^{th}$ splicing area in an order from left to right. Each splicing area does not have an overlapping part during splicing. As shown in FIG. 9A and FIG. 9B, the electronic device 100 may obtain a panorama of which a length is L. The panorama has a style gradually changing effect. For example, a style of the panorama from left to right is gradually changing from a daytime style to a night style.

In some embodiments, the electronic device 100 may further obtain a panorama or an image of another type from a gallery application, and perform style migration on the obtained panorama or the image of the another type by using the method in the embodiment shown in FIG. 9A and FIG. 9B.

In the foregoing method for performing style migration on a panorama, there is an overlapping part between adjacent areas used for style migration. After the electronic device 100 separately performs style migration on these areas by using the fused style migration model, a style of a splicing area captured from an adjacent area may be more smoothly migrated. That is, the foregoing method for segmenting the first panorama and capturing the splicing area from each area obtained after style migration can improve smoothness of a style effect of the panorama. A style of the panorama generated by the electronic device 100 from left to right may change more smoothly from a daytime style to a night style.

In this embodiment of this application, specific values of the length d of the sliding window, the distance $\Delta c$ of each sliding of the sliding window, a quantity m of areas obtained by segmenting the first panorama, and the length of each splicing area $\Delta c'$ are not limited.

In some embodiments, the sliding window may slide at different distances each time. In other words, lengths of areas obtained by the electronic device 100 by segmenting the first panorama may be unequal. Lengths of the splicing areas captured by the electronic device 100 from the areas may also be different. That is, lengths of the splicing areas used for panorama splicing may be unequal.

Figure 10:
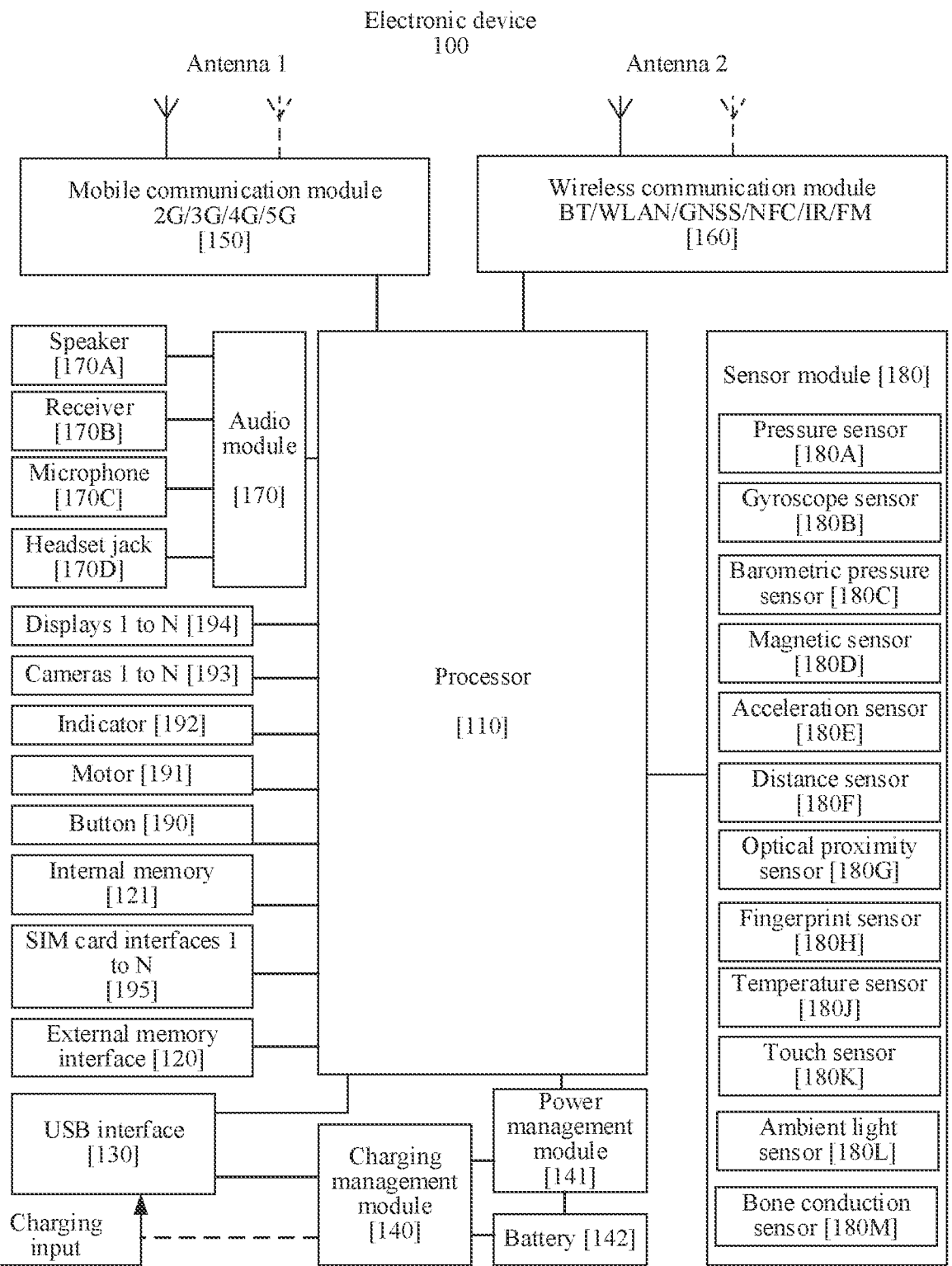
FIG. 10 is a schematic diagram of a structure of an electronic device 100 according to an embodiment of this application.

FIG. 10 is a schematic diagram of a structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may save instructions or data that is used or cyclically used by the processor 110. If the processor 110 needs to use the instructions or the data again, the processor may directly invoke the instructions or the data from the memory. This avoids repeated access, reduces waiting time of the processor 110, and therefore improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device.

The charging management module 140 is configured to receive a charging input from a charger.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal by using an audio device (which is not limited to the speaker 170A, the receiver 170B, or the like), or displays an image or a video by using the display 194.

The wireless communication module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communications processor module. The wireless communication module 160 receives an electromagnetic wave through the antenna 2, performs frequency modulation and filtering processing on an electromagnetic wave signal, and transmits a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communications technology.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is opened, light is transmitted to a photosensitive element of the camera by using a lens, an optical signal is converted into an electrical signal, and the electrical signal is transmitted by the photosensitive element of the camera to the ISP for processing and converted into an image visible to a naked eye. The ISP may further perform algorithm optimization on noise, brightness, and a skin color of the image. The ISP may further optimize parameters such as exposure and a color temperature of a photographing scenario. In some embodiments, the ISP may be disposed on the camera 193.

In some embodiments, the ISP may further perform image stabilization processing on a plurality of frames of images in the video. The ISP may compensate the image based on data collected by the motion sensor, to reduce problems such as image instability and defocus caused by shaking of the electronic device 100 in a shooting process.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

In some embodiments of this application, the NPU may store a plurality of style migration models. The NPU may perform, by using the style migration model, style migration on an image obtained through ISP processing. For example, when a plurality of frames of images in a video are received, the NPU may perform fusion on a plurality of style migration models by using the methods shown in FIG. 3 and FIG. 4, and separately perform style migration on the plurality of frames of images by using a fused style migration model obtained through fusion.

The external memory interface 120 may be configured to connect to an external storage card, to extend a storage capability of the electronic device 100. The external memory card communicates with the processor 110 through the external memory interface 120, to implement a data storage function. For example, files such as music and a video are saved in the external storage card.

The internal memory 121 may be configured to store computer-executable program code. The executable program code includes instructions. The processor 110 runs the instructions stored in the internal memory 121, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal.

The gyroscope sensor 180B may be configured to determine a moving posture of the electronic device 100. In some embodiments, an angular velocity of the electronic device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as conversion between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED), and an optical detector, for example, a photodiode. The light emitting diode may be an infrared light emitting diode. The electronic device 100 may detect, by using the optical proximity sensor 180G, that the user holds the electronic device 100 close to an ear for a call, to automatically turn off a screen for power saving.

The ambient light sensor 180L is configured to sense ambient light brightness. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194.

The bone conduction sensor 180M may obtain a vibration signal. In some embodiments, the bone conduction sensor 180M may obtain a vibration signal of a vibration bone of a human vocal-cord part.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card.

In this embodiment of this application, the electronic device may obtain a first image sequence. The first image sequence may be a video or a plurality of frames of images obtained by segmenting a panorama. When the first image sequence is a video, the first image sequence may be obtained after the electronic device in the embodiment shown in FIG. 1A to FIG. 1F starts the camera for shooting. Alternatively, the first image sequence may be obtained by the electronic device in the embodiment shown in FIG. 7A to FIG. 7C from a gallery application. When the first image sequence is a plurality of frames of images obtained by segmenting the panorama, the panorama may be obtained by the electronic devices shown in FIG. 8A to FIG. 8D by starting the camera for shooting.

In this embodiment of this application, the electronic device may process the first image sequence based on the target migration style, to obtain a second image sequence. For example, the foregoing target migration style may be a day and night conversion style, a four-season change style, or a sunny and rainy weathers alternating style in the foregoing embodiment. In the embodiment shown in FIG. 1C, the electronic device 100 may determine a target migration style based on a user operation performed on any style option of the style option 231.

In this embodiment of this application, the target migration style may be used to indicate that a style of a $1^{st}$ frame of image in the second image sequence changes to a style of an $n^{th}$ frame of image change in M styles in a first style order. The target migration style may be used to determine a size of M, namely, a quantity of style migration models used for fusion. In some embodiments, the higher-layer semantic information of the image in the second image sequence obtained in the foregoing first style order may present a change in natural time order. For example, the target migration style is a day and night conversion style. In this case, the M styles may be a daytime style and a night style. The first style order may be an order of changing from the daytime style to the night style. The target migration style is the four-season change style. In this case, the M styles may be a spring style, a summer style, an autumn style, and a winter style. The foregoing first style order may be changing from the spring style to the summer style, then from the summer style to the autumn style, and then from the autumn style to the night style. An arrangement order of the M styles in the first style order is not limited in this embodiment of this application.

In this embodiment of this application, the electronic device may process the first image sequence based on the target migration style by using k fused style migration models. The k fused style migration models may be generated by weighting the M single-style migration models. For an implementation method in which the electronic device generates the k fused style migration models and processes the first image sequence by using the k fused style migration models, refer to the embodiment shown in FIG. 4.

According to the context, the term "when" used in the foregoing embodiments may be interpreted as a meaning of "if", "after", "in response to determining", or "in response to detecting". Similarly, based on the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions based on embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM a random access memory RAM, a magnetic disk, or an optical disc.

What is claimed is:

1. A method applied to an electronic device and comprising:

obtaining a first image sequence;

processing the first image sequence based on a target migration style using k fused style migration models in order to obtain a second image sequence, wherein output images of the k fused style migration models are the second image sequence, wherein an output image of one fused style migration model is one frame of image or a plurality of consecutive frames of images in the second image sequence, wherein both the first image sequence and the second image sequence comprise n frames of images, wherein higher-layer semantic information of an $i^{th}$ frame of image in the first image sequence is the same as that of an $i^{th}$ frame of image in the second image sequence, wherein low-layer semantic information of the $i^{th}$ frame of image in the first image sequence and the $i^{th}$ frame of image in the second image sequence have different styles, wherein the target migration style indicates that a style of a $1^{st}$ frame of image to a style of an $n^{th}$ frame of image in the second image sequence change in M styles in a first style order, wherein the low-layer semantic information comprises a color and a texture of an image, wherein the one fused style migration model is based on weighting M single-style migration models, wherein when a style of the output image of the one fused style migration model is closer to a style of an output image of a $j^{th}$ single-style migration model, a weight of the $j^{th}$ single-style migration model is larger when the one fused style migration model is generated, wherein styles of respective output images of the M single-style migration models form the M styles, and wherein j is a positive integer less than or equal to M, wherein k is less than or equal to n, wherein n and M are integers greater than 1, and wherein i is a positive integer less than or equal to n; and saving the second image sequence.

2. The method of claim 1, wherein the k fused style migration models and the M single-style migration models are neural network models and have a same neural network structure.

3. The method of claim 2, wherein the single-style migration model is trained, and wherein the method further comprises:

obtaining a training dataset, wherein the training dataset comprises one or more frames of style images and a plurality of frames of content images in a first video, and wherein a style of the one or more frames of style images is a style of an output image of a trained single-style migration model;

processing the plurality of frames of content images using a to-be-trained single-style migration model in order to obtain a plurality of frames of composite images;

determining a high-layer semantic information loss function based on high-layer semantic information of the plurality of frames of content images and high-layer semantic information of the plurality of frames of composite images;

determining a style loss function based on styles of the plurality of frames of content images and styles of the plurality of frames of composite images;

determining a time-domain constraint loss function based on a style of one frame of composite image in the plurality of frames of composite images and styles of a second plurality of frames of composite images adjacent to the one frame of composite image; and training the to-be-trained single-style migration model by using a loss function in order to obtain the trained single-style migration model, wherein the loss function comprises the high-layer semantic information loss function, the style loss function, and the time-domain constraint loss function.

4. The method of claim 1, wherein obtaining the first image sequence comprises:

enabling a camera to collect a first video; and extracting the n frames of images in the first image sequence from z frames of images, wherein the first video comprises the z frames of images.

5. The method of claim 4, wherein before obtaining the n frames of images in the first image sequence based on the first video, the method further comprises performing image stabilization processing on the first video.

6. The method of claim 4, wherein a frame extraction ratio of extraction is based on a playback duration of the first image sequence selected by a user, and wherein the frame extraction ratio is a ratio of the playback duration of the first image sequence to a collection duration of the first video.

7. The method of claim 4, wherein saving the second image sequence comprises sequentially saving the n frames of images in the second image sequence in series as a video.

8. The method of claim 4, wherein obtaining the first image sequence further comprises:

obtaining a first image; and segmenting the first image in order to obtain the n frames of images in the first image sequence.

9. The method of claim 8, wherein saving the second image sequence comprises:

capturing one splicing area from each frame of image in the second image sequence in order to obtain n splicing areas, wherein the n splicing areas have no overlapping part;

splicing the n splicing areas to obtain a second image; and storing the second image, wherein a resolution of the second image is the same as a resolution of the first image.

10. The method of claim 8, wherein all frames of images in the first image sequence have a same resolution, and wherein two adjacent frames of images in the first image sequence have an overlapping part.

11. The method of claim 1, wherein obtaining the first image sequence comprises:

obtaining, based on a first video selected by a user, the first video from a locally-stored video; and extracting the n frames of images in the first image sequence from z frames of images, wherein the first video comprises the z frames of images.

12. An electronic device, comprising:

a memory configured to store a plurality of single-style migration models and a computer program; and one or more processors coupled to the memory and configured to execute the computer program to cause the electronic device to:

obtain a first image sequence;

process the first image sequence based on a target migration style using k fused style migration models in order to obtain a second image sequence, wherein output images of the k fused style migration models are the second image sequence, wherein an output image of one fused style migration model is one frame of image or a plurality of consecutive frames of images in the second image sequence, wherein both the first image sequence and the second image sequence comprise n frames of images, wherein higher-layer semantic information of an $i^{th}$ frame of image in the first image sequence is the same as that of an $i^{th}$ frame of image in the second image sequence, wherein low-layer semantic information of the $i^{th}$ frame of image in the first image sequence and the $i^{th}$ frame of image in the second image sequence have different styles, wherein the target migration style indicates that a style of a $1^{st}$ frame of image to a style of an $n^{th}$ frame of image in the second image sequence change in M styles in a first style order, wherein the low-layer semantic information comprises a color and a texture of an image, wherein the one fused style migration model is based on weighting M single-style migration models, wherein when a style of the output image of the one fused style migration model is closer to a style of an output image of a $j^{th}$ single-style migration model, a weight of the $j^{th}$ single-style migration model is larger when the one fused style migration model is generated, wherein styles of respective output images of the M single-style migration models form the M styles, and wherein j is a positive integer less than or equal to M, wherein k is less than or equal to n, wherein n and M are integers greater than 1, and wherein i is a positive integer less than or equal to n; and save the second image sequence.

13. The electronic device of claim 12, wherein the k fused style migration models and the M single-style migration models are neural network models and have a same neural network structure.

14. The electronic device of claim 13, wherein the one or more processors are further configured to execute the computer program to cause the electronic device to:

obtain a training dataset, wherein the training dataset comprises one or more frames of style images and a plurality of frames of content images in a first video, and a style of the one or more frames of style images is a style of an output image of a trained single-style migration model;

process the plurality of frames of content images using a to-be-trained single-style migration model in order to obtain a plurality of frames of composite images;

determine a high-layer semantic information loss function based on high-layer semantic information of the plurality of frames of content images and high-layer semantic information of the plurality of frames of composite images;

determine a style loss function based on styles of the plurality of frames of content images and styles of the plurality of frames of composite images;

determine a time-domain constraint loss function based on a style of one frame of composite image in the plurality of frames of composite images and styles of a second plurality of frames of composite images adjacent to the one frame of composite image; and train the to-be-trained single-style migration model by using a loss function in order to obtain the trained single-style migration model, wherein the loss function comprises the high-layer semantic information loss function, the style loss function, and the time-domain constraint loss function.

15. The electronic device of claim 12, wherein the one or more processors are further configured to execute the computer program to cause the electronic device to:

enable a camera to collect a first video; and extract the n frames of images in the first image sequence from z frames of images, wherein the first video comprises the z frames of images.

16. The electronic device of claim 15, wherein the one or more processors are further configured to execute the computer program to cause the electronic device to perform image stabilization processing on the first video.

17. The electronic device of claim 15, wherein a frame extraction ratio of extraction is based on a playback duration of the first image sequence selected by a user, and wherein the frame extraction ratio is a ratio of the playback duration of the first image sequence to a collection duration of the first video.

18. The electronic device of claim 15, wherein the one or more processors are further configured to execute the computer program to cause the electronic device to save the second image sequence by sequentially saving the n frames of images in the second image sequence in series as a video.

19. The electronic device of claim 15, wherein the one or more processors are further configured to execute the computer program to cause the electronic device to obtain the first image sequence by:

obtaining a first image; and segmenting the first image in order to obtain the n frames of images in the first image sequence.

20. The electronic device of claim 12, wherein the one or more processors are further configured to execute the computer program to cause the electronic device to obtain the first image sequence by:

obtaining, based on a first video selected by a user, the first video from a locally-stored video; and extracting the n frames of images in the first image sequence from z frames of images, wherein the first video comprises the z frames of images.

* * * * *